United States Patent
Nguyenquang et al.

(10) Patent No.: US 12,498,739 B2
(45) Date of Patent: Dec. 16, 2025

(54) TRAVELING SYSTEM, TRAVELING METHOD, AND RECORDING MEDIUM IN WHICH TRAVELING PROGRAM IS RECORDED

(71) Applicant: SHARP KABUSHIKI KAISHA, Sakai (JP)

(72) Inventors: Thinh Nguyenquang, Sakai (JP); Akihiro Yamakawa, Sakai (JP); Hiroshi Yamauchi, Sakai (JP); Masahiro Sakakibara, Sakai (JP); Kazushi Kuwahata, Sakai (JP); Hiroki Osawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 27 days.

(21) Appl. No.: 18/791,476

(22) Filed: Aug. 1, 2024

(65) Prior Publication Data
US 2025/0068184 A1    Feb. 27, 2025

(30) Foreign Application Priority Data
Aug. 25, 2023 (JP) .................. 2023-136903

(51) Int. Cl.
G05D 1/693   (2024.01)
G05D 1/244   (2024.01)
G05D 101/00  (2024.01)

(52) U.S. Cl.
CPC .......... *G05D 1/693* (2024.01); *G05D 1/2446* (2024.01); *G05D 2101/22* (2024.01)

(58) Field of Classification Search
CPC .. G05D 1/693; G05D 1/2446; G05D 2101/22; G05D 2105/28; G05D 2107/70; G05D 2109/10; G05D 1/246; G05D 1/6987; G05D 2111/34; G05D 1/247
See application file for complete search history.

(56) References Cited

FOREIGN PATENT DOCUMENTS

JP      2002-341939 A    11/2002

*Primary Examiner* — Brodie J Follman
(74) *Attorney, Agent, or Firm* — ScienBiziP, P.C.

(57) ABSTRACT

A traveling system includes a registration processing unit that registers map data including arrangement information of a plurality of tags, a setting processing unit that sets arrangement information of a plurality of control points in a travelable area of a second automatic traveling device in the map data, and a generation processing unit that generates a first traveling route along which the first automatic traveling device travels by sequentially following the tags and a second traveling route along which the second automatic traveling device travels by sequentially following the control points such that the first automatic traveling device and the second automatic traveling device do not interfere with each other.

9 Claims, 16 Drawing Sheets

FIG. 4

| PRODUCT ID | PRODUCT NAME | SHELF ID |
|---|---|---|
| 0001 | PRODUCT A | T1 |
| 0002 | PRODUCT B | T2 |
| 0003 | PRODUCT C | T3 |
| ... | ... | ... |

| UNIT ORDER ID | CUSTOMER ID | ORDER PRODUCT | QUANTITY | ORDER DATE AND TIME |
|---|---|---|---|---|
| O1 | CUSTOM1 | PRODUCT E | 2 | ... |
| O2 | CUSTOM1 | PRODUCT F | 3 | ... |
| O3 | CUSTOM2 | PRODUCT G | 5 | ... |
| O4 | CUSTOM2 | PRODUCT H | 5 | ... |

| SET ORDER ID | UNIT ORDER ID | SHELF ID |
|---|---|---|
| SET1 | O1, O2, O3, O4 | T3 |
| SET2 | ... | ... |
| ... | ... | ... |

| TAG ID | TAG TYPE | POSITIONAL COORDINATES | VIRTUAL TAG ID |
|---|---|---|---|
| 0001 | TWO-DIMENTIONAL CODE | P001 | - |
| 0002 | TWO-DIMENTIONAL CODE | P002 | - |
| 0003 | TWO-DIMENTIONAL CODE | P003 | - |
| 0004 | TWO-DIMENTIONAL CODE | P004 | - |
| 0005 | TWO-DIMENTIONAL CODE | P005 | - |
| 0006 | TWO-DIMENTIONAL CODE | P006 | - |
| 0007 | TWO-DIMENTIONAL CODE | P007 | - |
| ... | ... | ... | ... |
| 1001 | RFID | P101 | 0001 |
| 1002 | RFID | P102 | 0002 |
| 1003 | RFID | P103 | 0003 |
| ... | ... | ... | ... |

| TAG ID | POSITIONAL COORDINATES |
|---|---|
| 0004 | P004 |
| 0005 | P005 |
| ... | ... |

| VIRTUAL TAG ID | CORRESPONDING TAG ID | POSITIONAL COORDINATES |
|---|---|---|
| A01 | 0006 | P006 |
| A02 | 0007 | P007 |
| ... | ... | ... |

| VIRTUAL TAG ID | CORRESPONDING TAG ID | POSITIONAL COORDINATES |
|---|---|---|
| R01 | 0001 | P001 |
| R02 | 0002 | P002 |
| ... | ... | ... |

| TAG ID | POSITIONAL COORDINATES | PROHIBITION TAG ID | POSITIONAL COORDINATES |
|---|---|---|---|
| 0101 | P101 | 0111 | P111 |
| 0102 | P102 | 0112 | P112 |
| ... | ... | ... | ... |

| TAG ID | POSITIONAL COORDINATES | PROHIBITION TAG ID | POSITIONAL COORDINATES |
|---|---|---|---|
| 0201 | P201 | 0211 | P211 |
| 0202 | P202 | 0212 | P212 |
| ... | ... | ... | ... |

| TAG ID | POSITIONAL COORDINATES | PROHIBITION TAG ID | POSITIONAL COORDINATES |
|---|---|---|---|
| 0301 | P301 | 0311 | P311 |
| 0302 | P302 | 0312 | P312 |
| ... | ... | ... | ... |

FIG. 21

| TAG ID | POSITIONAL COORDINATES | STOPPABLE AGV TYPE |
|---|---|---|
| 0001 | P001 | SMALL-SIZED AGV |
| 0002 | P002 | SMALL-SIZED AGV, LARGE-SIZED AGV |
| 0003 | P003 | SMALL-SIZED AGV |
| 0004 | P004 | SMALL-SIZED AGV |
| 0005 | P005 | SMALL-SIZED AGV |
| 0006 | P006 | SMALL-SIZED AGV, LARGE-SIZED AGV |
| 0007 | P007 | SMALL-SIZED AGV |
| ... | ... | ... |

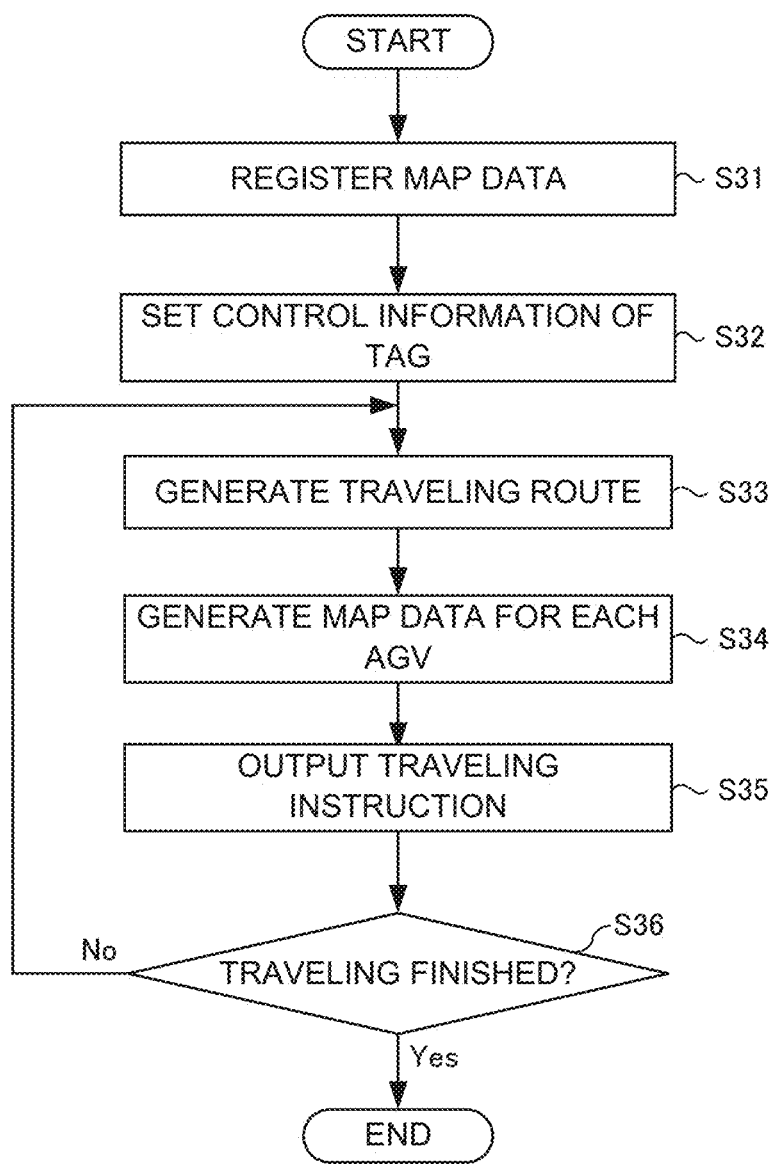

TRAVELING SYSTEM, TRAVELING METHOD, AND RECORDING MEDIUM IN WHICH TRAVELING PROGRAM IS RECORDED

INCORPORATION BY REFERENCE

This application is based upon and claims the benefit of priority from the corresponding Japanese Patent Application No. 2023-136903 filed on Aug. 25, 2023, the entire contents of which are incorporated herein by reference.

BACKGROUND

The present disclosure relates to a traveling system that causes an automatic traveling device to travel, a traveling method, and a recording medium in which a traveling program is recorded.

In the related art, there is a known traveling system that causes an automatic traveling device (an AGV, a traveling vehicle, or the like) to travel to a destination position along a traveling route previously set by a predetermined guiding method. The guiding method includes, for example, a guiding method (tag method) for guiding the automatic traveling device by causing the automatic traveling device to travel by sequentially following a plurality of tags arranged on a floor surface based on a detection result obtained by detecting the plurality of tags, a guiding method (line guide method) for guiding the automatic traveling device by causing the automatic traveling device to travel along a linear guide member (for example, a magnetic tape) arranged on the floor surface along a route based on a detection result obtained by detecting the guide member, and a guiding method (guideless method) for guiding the automatic traveling device based on the self-position estimated on the basis of measurement data of the surrounding environment.

A traveling system according to the related art is designed as a system that controls traveling of automatic traveling devices by the same guiding method, and it is not assumed to control traveling of automatic traveling devices having different guiding methods. Therefore, for example, when traveling of a plurality of automatic traveling devices having different guiding methods is controlled in the same area, there is a problem of a reduction in the safety and the traveling efficiency.

An object of the present disclosure is to provide a traveling system, a traveling method, and a recording medium in which a traveling program is recorded, by which it is possible to control traveling of a plurality of automatic traveling devices having different guiding methods.

SUMMARY

A traveling system according to an aspect of the present disclosure is a system that guides a first automatic traveling device by a first guiding method for guiding the first automatic traveling device by detecting a plurality of tags arranged on a floor surface and guides a second automatic traveling device by a second guiding method different from the first guiding method. The traveling system includes a registration processing unit, a setting processing unit, and a generation processing unit. The registration processing unit registers map data including arrangement information of the plurality of tags. The setting processing unit sets arrangement information of a plurality of control points in a travelable area of the second automatic traveling device in the map data. The generation processing unit generates a first traveling route on which the first automatic traveling device travels by sequentially following the tags and a second traveling route on which the second automatic traveling device travels by sequentially following the control points such that the first automatic traveling device and the second automatic traveling device do not interfere with each other.

A traveling method according to another aspect of the present disclosure is a method for guiding a first automatic traveling device by a first guiding method for guiding the first automatic traveling device by detecting a plurality of tags arranged on a floor surface and for guiding a second automatic traveling device by a second guiding method different from the first guiding method. The traveling method causes one or more processors to execute: registering map data including arrangement information of the plurality of tags; setting arrangement information of a plurality of control points in a travelable area of the second automatic traveling device in the map data; and generating a first traveling route along which the first automatic traveling device travels by sequentially following the tags and a second traveling route along which the second automatic traveling device travels by sequentially following the control points such that the first automatic traveling device and the second automatic traveling device do not interfere with each other.

A recording medium according to another aspect of the present disclosure is a recording medium having recorded thereon a program for guiding a first automatic traveling device by a first guiding method for guiding the first automatic traveling device by detecting a plurality of tags arranged on a floor surface and for guiding a second automatic traveling device by a second guiding method different from the first guiding method. The traveling program is a program causing one or more processors to execute: registering map data including arrangement information of the plurality of tags; setting arrangement information of a plurality of control points in a travelable area of the second automatic traveling device in the map data; and generating a first traveling route along which the first automatic traveling device travels by sequentially following the tags and a second traveling route along which the second automatic traveling device travels by sequentially following the control points such that the first automatic traveling device and the second automatic traveling device do not interfere with each other.

According to the present disclosure, it is possible to provide a traveling system, a traveling method, and a recording medium in which a traveling program is recorded, by which it is possible to control traveling of a plurality of automatic traveling devices having different guiding methods.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a table illustrating an example of product information used in the traveling system according to the first embodiment of the present disclosure.

FIG. 5 is a table illustrating an example of order information used in the traveling system according to the first embodiment of the present disclosure.

FIG. 6 is a table illustrating an example of transportation information used in the traveling system according to the first embodiment of the present disclosure.

FIG. 7 is a table illustrating an example of map data used in the traveling system according to the first embodiment of the present disclosure.

FIG. 9 is a table illustrating an example of map data corresponding to AGV1 according to the first embodiment of the present disclosure.

FIG. 10 is a table illustrating an example of map data corresponding to AGV2 according to the first embodiment of the present disclosure.

FIG. 11 is a table illustrating an example of map data corresponding to AGV3 according to the first embodiment of the present disclosure.

FIG. 15 is a table illustrating an example of map data corresponding to AGV1 according to the second embodiment of the present disclosure.

FIG. 16 is a table illustrating an example of map data corresponding to AGV2 according to the second embodiment of the present disclosure.

FIG. 17 is a table illustrating an example of map data corresponding to AGV3 according to the second embodiment of the present disclosure.

FIG. 21 is a diagram illustrating an example of map data used in the traveling system according to a fourth embodiment of the present disclosure.

FIG. 22 is a flowchart illustrating an example of a procedure of a traveling process executed by the traveling system according to the fourth embodiment of the present disclosure.

DETAILED DESCRIPTION

Hereinafter, embodiments of the present disclosure will be described with reference to the accompanying drawings for understanding of the present disclosure. It should be noted that the following embodiment is an example in which the present disclosure is embodied, and does not limit the technical scope of the present disclosure.

First Embodiment

Traveling System 10

Figure 1:
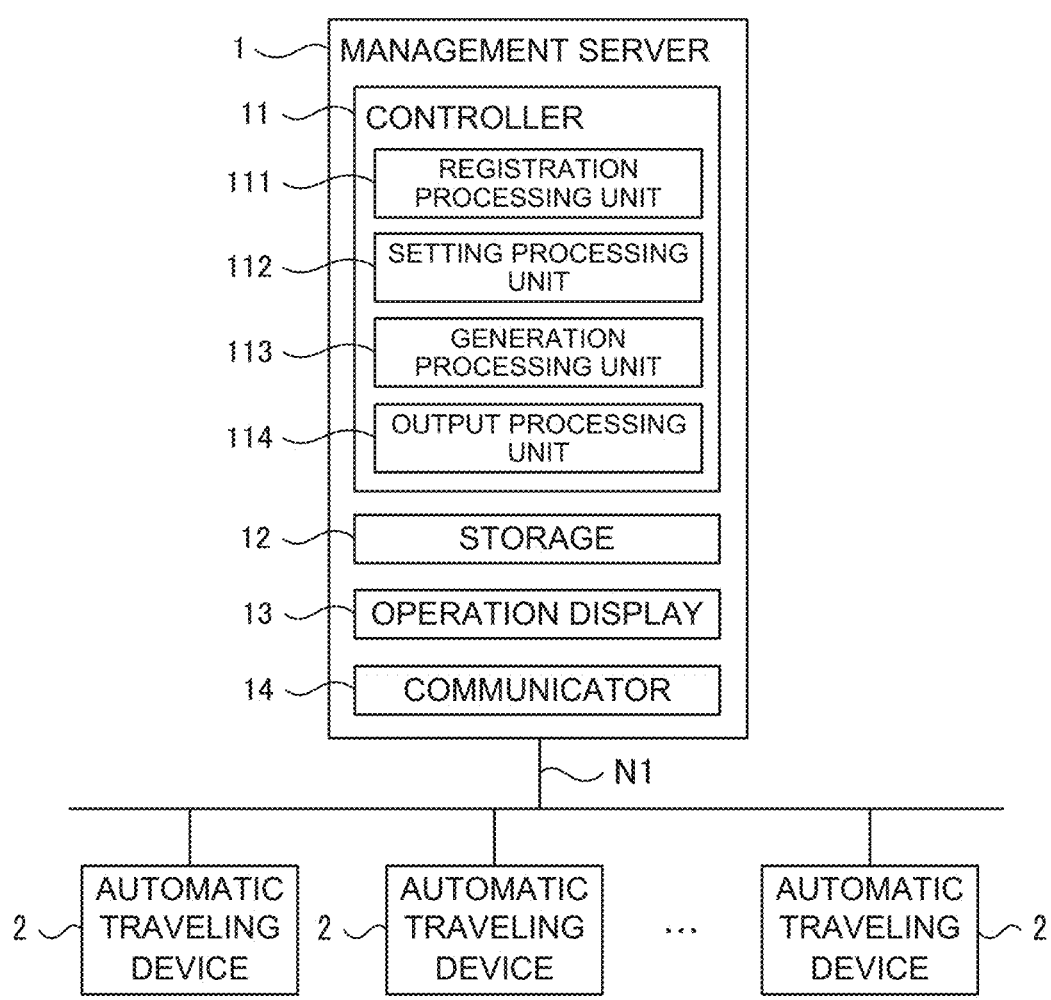
FIG. 1 is a block diagram illustrating a configuration of a traveling system according to a first embodiment of the present disclosure.

As illustrated in FIG. 1, a traveling system 10 according to a first embodiment of the present disclosure includes a management server 1 and an automatic traveling device 2 (also referred to as an automated guided vehicle (AGV)). The management server 1 and the automatic traveling device 2 can communicate with each other via a communication network N1 such as a wireless local area network (LAN).

The traveling system 10 according to the first embodiment is a traveling system that is capable of guiding a first automatic traveling device 2 by a tag method (a first guiding method) for guiding the first automatic traveling device 2 by detecting a plurality of tags (code tags) arranged on a floor surface and is capable of guiding a second automatic traveling device 2 by a second guiding method (a line guide method, a guideless method, or the like) different from the tag method. In the tag method, the automatic traveling device 2 travels along a preset traveling route while detecting two-dimensional codes (or markers, or the like) arranged (attached) on the floor surface. In the line guide method, the automatic traveling device 2 travels along a preset traveling route while controlling traveling (changing the direction, stopping, or the like) by detecting a linear guide member (for example, a magnetic tape) arranged (attached) on the floor surface and detecting an RFID tag (or a two-dimensional code, a marker, or the like) arranged (attached) on the floor surface. In the guideless method, the automatic traveling device 2 travels along a preset traveling route based on the self-position estimated on the basis of the measurement data of the surrounding environment.

The traveling system 10 includes at least the automatic traveling device 2 that travels by the tag method and the automatic traveling device 2 that travels by the line guide method or the automatic traveling device 2 that travels by the guideless method. According to the present embodiment, it is assumed that the traveling system 10 includes the automatic traveling device 2 that travels by the tag method, the automatic traveling device 2 that travels by the line guide method, and the automatic traveling device 2 that travels by the guideless method. Further, for example, in the traveling system 10, a plurality of paths is set, along which the automatic traveling device 2 can travel, and a path to be traveled among the plurality of paths is designated as a traveling route for the automatic traveling device 2 so that a transportation target is transported from a storage position to a destination position. The traveling system 10 is applied to, for example, a facility such as a factory or a warehouse that stores products (transportation targets). For example, when accepting an order for a product from a customer (customer terminal), the traveling system 10 outputs a traveling instruction (transportation request) to the automatic traveling device 2. When acquiring the traveling instruction, the automatic traveling device 2 moves to the storage position (storage shelf) of the product, picks the product, and transports the product to a delivery location. A customer can order a product by accessing a WEB site (order page) operated by an order server (not illustrated) using an information processing apparatus (customer terminal) such as a personal computer or a smartphone.

The order server can accept an order for the product from each of a plurality of customer terminals, aggregates each piece of accepted order information, and outputs the aggregated order information to the management server 1. The management server 1 manages the operation of each of the plurality of automatic traveling devices 2 and outputs a traveling instruction to each of the automatic traveling devices 2 based on the order information. The automatic traveling device 2 autonomously travels along the preset traveling route based on the traveling instruction, picks the product included in the order information from the storage shelf, and transports the product to the delivery location.

Further, for example, the automatic traveling device 2 is provided with a plurality of containers (containing units) and contains the product ordered by the customer in each container and thus can collectively transport the products for the plurality of customers by one picking traveling (traveling by moving from a standby location to the delivery location while going around each shelf). For example, when the automatic traveling device 2 is provided with two containers, the automatic traveling device 2 can collectively transport the ordered products for two customers. The management server 1 outputs the traveling instruction corresponding to the order information of one or more customers to each of the automatic traveling devices 2.

Figure 2:
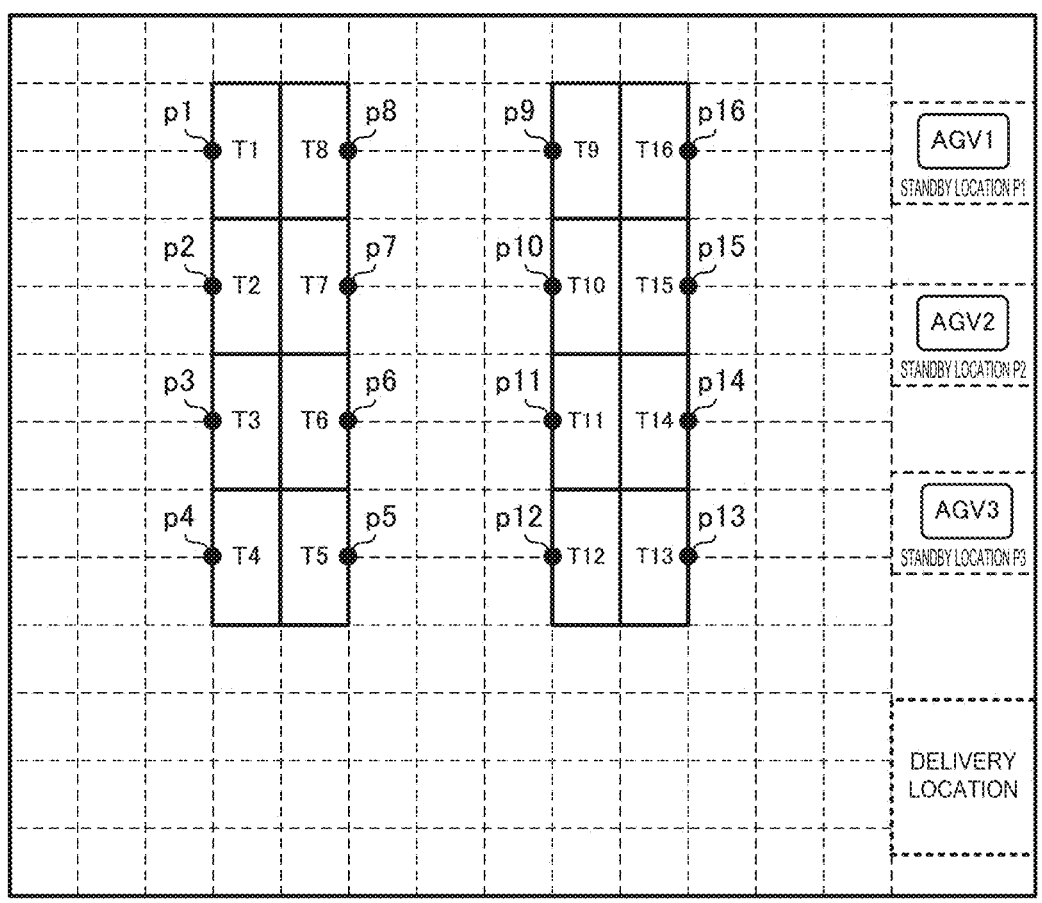
FIG. 2 is a diagram schematically illustrating a configuration of a facility to which the traveling system according to the first embodiment of the present disclosure is applied.

FIG. 2 illustrates an example of a facility W1 to which the traveling system 10 is applied. In the facility W1 illustrated in FIG. 2, a plurality of storage shelves (storage positions) is arranged to store products (transportation targets). FIG. 2 illustrates 16 storage shelves T1 to T16. The positions (picking positions p1 to p16), at which the automatic traveling device 2 picks a product, are set for the respective storage shelves T1 to T16.

In the facility W1, a standby location of the automatic traveling device 2 is set. For example, in the facility W1, a standby location P1 where AGV1 (the automatic traveling device 2) stands by, a standby location P2 where AGV2 (the automatic traveling device 2) stands by, and a standby location P3 where AGV3 (the automatic traveling device 2) can stands by are set. Each of the automatic traveling devices 2 stands by at a predetermined standby location when the automatic traveling device 2 has received no traveling instruction from the management server 1.

When acquiring the traveling instruction from the management server 1, each of the automatic traveling devices 2 moves from the standby location to the storage shelf that stores the ordered product. For example, when acquiring the traveling instruction including the product in the storage shelf T1 in the order information from the management server 1, AGV1 moves to the picking position p1 corresponding to the storage shelf T1 along the preset traveling route, picks the ordered product at the picking position p1 or accepts the ordered product from the worker in charge of the picking work, and then moves to the delivery location along the preset traveling route.

Figure 3:
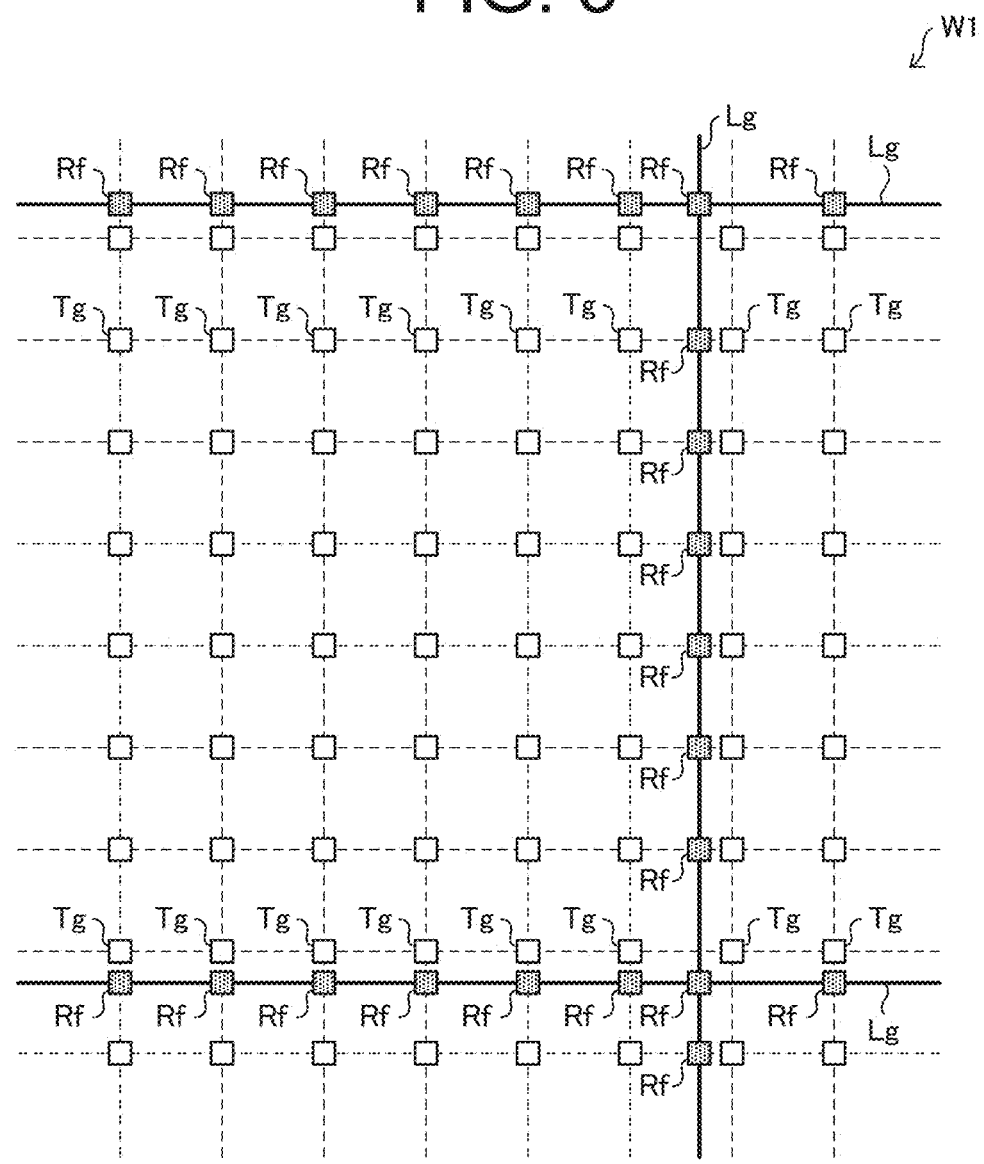
FIG. 3 is a diagram illustrating an arrangement example of tags arranged in a facility to which the traveling system according to the first embodiment of the present disclosure is applied.

FIG. 3 illustrates the arrangement example of the tags arranged on the floor surface in a travelable area of the automatic traveling device 2 in the facility W1. The tags include tags (hereinafter referred to as code tags Tg) used in the tag method (the first guiding method), in which the automatic traveling device 2 travels while detecting two-dimensional codes, and tags (hereinafter referred to as RFID tags Rf) used in the line guide method (the second guiding method), in which the automatic traveling device 2 travels while detecting a linear guide member and an RFID. As illustrated in FIG. 3, the code tags Tg are arranged at predetermined intervals. Further, a magnetic tape Lg, which is a guide member, is arranged on the floor surface in the travelable area of the automatic traveling device 2 that travels by the line guide method, and the RFID tags Rf are arranged on the magnetic tape Lg at predetermined intervals. Further, each of the RFID tags Rf is arranged near the code tag Tg so that the one RFID tag Rf corresponds to the one code tag Tg. The area where the code tags Tg are arranged corresponds to the travelable area of the automatic traveling device 2 that travels by the tag method, and the area where the magnetic tape Lg is arranged corresponds to the travelable area of the automatic traveling device 2 that travels by the line guide method. Further, the area where the code tags Tg are arranged also corresponds to the travelable area of the automatic traveling device 2 that travels by the guideless method.

In the facility W1, for example, the automatic traveling device 2, which travels by the tag method, travels along the traveling route while detecting the code tags Tg, and the automatic traveling device 2, which travels by the line guide method, travels while detecting the magnetic tapes Lg and the RFID tags Rf. Further, the automatic traveling device 2, which travels by the guideless method, travels along the traveling route while estimating the self-position in the travelable area where the code tags Tg, the magnetic tapes Lg, and the RFID tags Rf are arranged.

According to the present embodiment, the traveling system 10 corresponds to a traveling system according to the present disclosure; however, the traveling system according to the present disclosure may be configured by the management server 1 alone, or may include one or more components of the management server 1 and the automatic traveling device 2. The above-described configuration is the same in each embodiment described below.

Management Server 1

As illustrated in FIG. 1, the management server 1 is a server including a controller 11, a storage 12, an operation display 13, a communicator 14, and the like. The management server 1 is not limited to one computer, and may be a computer system in which a plurality of computers operates in cooperation with each other. Various processes executed by the management server 1 may be executed by one or more processors in a distributed manner.

The communicator 14 is a communication interface to connect the management server 1 to a communication network N1 in a wired or wireless manner and execute data communications with the one or more automatic traveling devices 2 via the communication network N1 in accordance with a predetermined communication protocol.

The operation display 13 is a user interface including a display such as a liquid crystal display or an organic EL display that displays various kinds of information and an operation acceptor such as a mouse, a keyboard, or a touch panel that accepts an operation.

The storage 12 is a non-volatile storage such as a hard disk drive (HDD) or a solid state drive (SSD) that stores various types of information. Specifically, the storage 12 stores data such as product information D1, order information D2, transportation information D3, and map data D4. The product information D1 includes information about products stored in the facility W1. The order information D2 includes information about the order of a customer. The transportation information D3 includes information about the storage position of the product for the order of a customer. The map data D4 includes the arrangement information of the tags (the code tags Tg and the RFID tags Rf) arranged on the floor surface of the facility W1. FIG. 4 is a table illustrating an example of the product information D1, FIG. 5 is a table illustrating an example of the order information D2, FIG. 6 is a table illustrating an example of the transportation information D3, and FIG. 7 is a table illustrating an example of the map data D4.

As illustrated in FIG. 4, the product information D1 includes information such as corresponding "product ID", "product name", and "shelf ID" for each product. The product ID is identification information of a product, and the product name is the name of a product. The shelf ID is identification information of a storage shelf in which a product is stored. According to the present embodiment, as the shelf IDs, for example, "T1" indicating the storage shelf T1, "T2" indicating the storage shelf T2, "T3" indicating the storage shelf T3, and the like, are registered.

The product information D1 is previously stored in the storage 12, for example, by a registration operation of the administrator of the facility W1. Further, the administrator can appropriately update the product information D1.

As illustrated in FIG. 5, the order information D2 includes, for each order, information such as corresponding "unit order ID", "customer ID", "ordered product", "quantity", and "order date and time". The unit order ID is identification information of one order, and the customer ID is identification information of a customer who ordered a product. The ordered product is the name of a product ordered by the customer, and the quantity is an order quantity of the ordered product. The order date and time is information on the date and time when the order was accepted from the customer.

The order information D2 is registered by the controller 11 each time the management server 1 (or the order server) accepts an order from a customer.

As illustrated in FIG. 6, the transportation information D3 includes information such as corresponding "set order ID", "unit order ID", and "shelf ID" for each set order in which unit orders are combined. The set order ID is identification information of a set order in which unit orders are combined. The controller 11 generates a set order by combining unit orders based on information such as the storage position of a product, the current position of the automatic traveling device 2, and an operation rule.

The transportation information D3 is included in the traveling instruction transmitted to the automatic traveling device 2. For example, when AGV1 acquires the traveling instruction including the transportation information D3 of "SET1", AGV1 moves to the position of the shelf ID "T3" included in the transportation information D3. Then, AGV1 picks the respective products of the unit order IDs "O1", "O2", "O3", and "O4" in the storage shelf T3.

The controller 11 refers to the product information D1 (see FIG. 4) to generate the transportation information D3 (see FIG. 6).

As illustrated in FIG. 7, the map data D4 includes information such as corresponding "tag ID", "tag type", "positional coordinates", and "virtual tag ID" for each of the tags arranged in the travelable area of the automatic traveling device 2. The tag ID is identification information of the tag (the code tag Tg, the RFID tag Rf). The tag type is information indicating the type of a tag and is information indicating a two-dimensional code or an RFID. The code tag Tg corresponds to a two-dimensional code tag, and the RFID tag Rf corresponds to a RFID tag. The positional coordinates are information indicating the position of the tag in the travelable area and is, for example, information of an X coordinate and a Y coordinate when the travelable area is an XY plane. In FIG. 7, the X coordinate and the Y coordinate are represented by "P . . . " for convenience. The virtual tag ID is information indicating the tag ID of the code tag Tg corresponding to the RFID tag Rf. Each of the RFID tags Rf is arranged near the code tag Tg so that the one RFID tag Rf corresponds to the one code tag Tg. The code tag Tg corresponding to the one RFID tag Rf is referred to as a virtual tag. In the travelable area where the code tag Tg is arranged, the position in the travelable area can be specified by the positional coordinates of the code tag Tg. The map data D4 is an example of map data according to the present disclosure. When the tags are arranged on the floor surface of the facility W1, the controller 11 generates and registers the map data D4.

According to another embodiment, part or all of the product information D1, the order information D2, the transportation information D3, and the map data D4 may be stored in another server accessible from the management server 1 via the communication network N1. In this case, the controller 11 of the management server 1 may acquire the information from another server described above and execute each processing such as traveling processing (see FIG. 12) described below.

Further, the storage 12 stores a control program such as a traveling program for causing the controller 11 to execute the traveling processing (see FIG. 12) described below. For example, the traveling program is non-transitorily recorded in a computer-readable recording medium such as a CD or a DVD, read by a reading device (not illustrated) such as a CD drive or a DVD drive included in the management server 1, and stored in the storage 12.

The controller 11 includes control devices such as a CPU, a ROM, and a RAM. The CPU is a processor that executes various kinds of arithmetic processing. The ROM is a nonvolatile storage that previously stores control programs such as BIOS and OS to cause the CPU to execute various kinds of arithmetic processing. The RAM is a volatile or nonvolatile storage that stores various kinds of information and is used as a temporary storage memory (work area) for various kinds of processing executed by the CPU. The controller 11 controls the management server 1 by causing the CPU to execute various control programs previously stored in the ROM or the storage 12.

Furthermore, the traveling system according to the related art is designed as a system that controls traveling of the automatic traveling device by the identical guiding method, and it is not assumed to control the traveling of the automatic traveling device by different guiding methods. Therefore, for example, when traveling of a plurality of automatic traveling devices having different guiding methods is controlled in the same area, there is a problem of a reduction in the safety and the traveling efficiency. In contrast, as described below, the management server 1 according to the first embodiment has a configuration that can control traveling of a plurality of automatic traveling devices having different guiding methods.

Specifically, as illustrated in FIG. 1, the controller 11 includes various processing units such as a registration processing unit 111, a setting processing unit 112, a generation processing unit 113, and an output processing unit 114. The controller 11 functions as the various processing units by causing the CPU to execute various processes in accordance with the traveling program. Further, some or all of the processing units may be constituted by electronic circuits. The traveling program may be a program for causing a plurality of processors to function as the processing units.

The controller 11 accepts a transportation request (picking order) for a product (transportation target) corresponding to the automatic traveling device 2. Specifically, the controller 11 accepts the order information D2 (see FIG. 5) corresponding to the orders of a plurality of customers. For example, the controller 11 accepts the order information D2 (see FIG. 5) including the orders of customers CUSTOM1 and CUSTOM2.

When accepting the order information D2, the controller 11 generates the transportation information D3. For example, when the controller 11 accepts the order information D2 (see FIG. 5) including four orders (unit orders) of the customers CUSTOM1 and CUSTOM2, the controller 11 refers to the product information D1 (see FIG. 4) to generate the transportation information D3 (see FIG. 6) of "SET1". For example, the controller 11 generates the transportation information D3 by aggregating a plurality of products stored in the same area among a plurality of products included in the order information D2 into one order (set order). Further, the controller 11 generates the transportation information D3 assigned to each of the plurality of containers mounted on the automatic traveling device 2.

The registration processing unit 111 registers the map data D4 including the arrangement information of a plurality of tags. For example, when the tags (the code tags Tg and the RFID tags Rf) are arranged in the travelable area in the facility W1, the registration processing unit 111 generates the map data D4 (see FIG. 7) including the positional coordinates (the X-coordinate and the Y-coordinate) of each tag and the type (the two-dimensional code or the RFID) of each tag in accordance with the registration operation of the user and registers the map data D4 in the storage 12.

Figure 8:
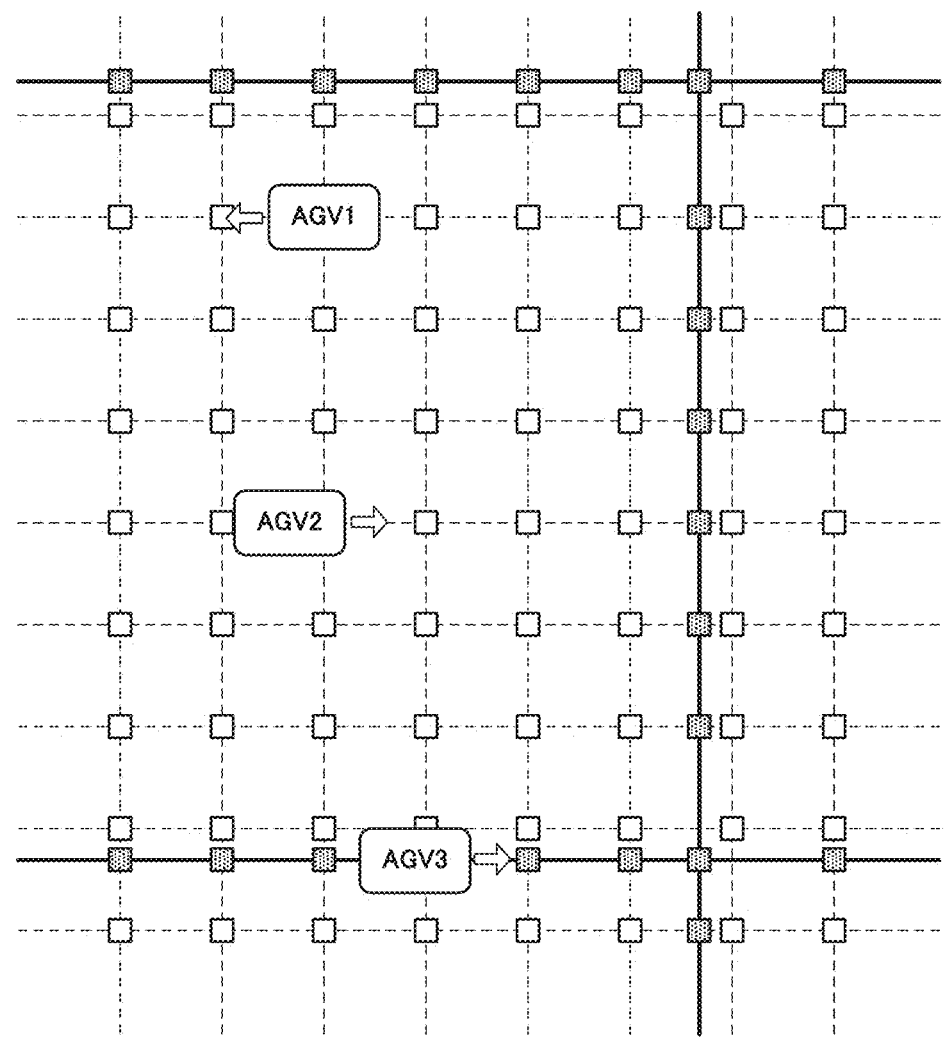
FIG. 8 is a diagram illustrating a traveling example of an automatic traveling device according to the first embodiment of the present disclosure.

Here, the automatic traveling device 2 that travels by the tag method is referred to as "AGV1", the automatic traveling device 2 that travels by the guideless method is referred to as "AGV2", and the automatic traveling device 2 that travels by the line guide method is referred to as "AGV3". As illustrated in FIG. 8, AGV1, AGV2, and AGV3 travel in the same area of the facility W1.

The setting processing unit 112 sets the arrangement information of a plurality of virtual tags (control points) in the travelable area of the automatic traveling device 2 (AGV2, AGV3) in the map data D4. Specifically, the setting processing unit 112 sets the arrangement information of the virtual tag (the code tag Tg) in the RFID tag Rf of AGV3. For example, as illustrated in FIG. 7, the setting processing unit 112 registers the tag ID (virtual tag ID) of the code tag Tg in association with each of the RFID tags Rf to associate the positional coordinates of the code tag Tg with the RFID tag Rf. Further, the setting processing unit 112 sets the arrangement information of the virtual tag (the code tag Tg) in the travelable area of AGV2. For example, the setting processing unit 112 registers the positional coordinates in the travelable area of AGV2 in association with the tag ID of the code tag Tg to associate the positional coordinates of the code tag Tg with the positional coordinates in the travelable area of AGV2.

The generation processing unit 113 generates a traveling route of each of the automatic traveling devices 2. For example, when a traveling start position and a destination position are set for each of the automatic traveling devices 2, the generation processing unit 113 generates a traveling route from the traveling start position to the destination position. The generation processing unit 113 performs the operation simulation on all the automatic traveling devices 2 and generates the traveling route in which the total of the transportation times of all the automatic traveling devices 2 is the shortest.

For example, the generation processing unit 113 observes the traveling situation (the current position, the traveling speed, the reserved traveling route, and the predicted arrival time of the reserved traveling route) of each of the automatic traveling devices 2. Each of the automatic traveling devices 2 transmits information such as the current position, the traveling speed, and the transportation state to the management server 1 in real time. Subsequently, the generation processing unit 113 performs the operation simulation on all the automatic traveling devices 2 in parallel and generates the traveling route such that the total of the transportation times of all the automatic traveling devices 2 becomes the shortest.

Here, in order to prevent AGV1, AGV2, and AGV3 from interfering with one another, the generation processing unit 113 generates the traveling route along which AGV1 travels by sequentially following the code tags Tg, the traveling route along which AGV2 travels by sequentially following the virtual tags (the code tags Tg), and the traveling route along which AGV3 travels by sequentially following the virtual tags (the RFID tags Rf).

For example, the generation processing unit 113 determines whether AGV1 interferes with AGV2 and AGV3 when AGV1 is located at any position of the plurality of code tags Tg and AGV2 and AGV3 are located at any position of the plurality of virtual tags. The generation processing unit 113 can grasp the current position of AGV2 based on the positional coordinates of the code tag Tg associated with AGV2 and can grasp the current position of AGV3 based on the positional coordinates (see FIG. 7) of the code tag Tg (or the RFID tag Rf) associated with AGV3.

Further, the generation processing unit 113 generates a sectional traveling route of AGV1 that has a predetermined length and forms a part of the entire traveling route from the current position to the destination position such that the sectional traveling route of AGV1 does not overlap with each of the sectional traveling route of AGV2 and the sectional traveling route of AGV3. Further, the generation processing unit 113 sets the virtual tags (the code tag Tg and the RFID tag Rf) included in a predetermined range where the interference may occur from the code tags Tg corresponding to the sectional traveling route of AGV1 as prohibition points at which traveling of AGV2 and AGV3 is prohibited and generates the sectional traveling routes of AGV2 and AGV3. A method for setting the prohibition point will be described according to a second embodiment below.

Further, the generation processing unit 113 repeatedly executes the process of generating the subsequent sectional traveling route by using the end position of the sectional traveling route as the start position of the subsequent sectional traveling route while AGV1 is traveling along the sectional traveling route. Similarly, the generation processing unit 113 repeatedly executes the process of generating the subsequent sectional traveling route by using the end position of the subsequent sectional traveling route as the start position of the subsequent sectional traveling route while AGV2 is traveling along the sectional traveling route and repeatedly executes the process of generating the subsequent sectional traveling route by using the end position of the sectional traveling route as the start position of the subsequent sectional traveling route while AGV3 is traveling along the sectional traveling route.

When the traveling route (sectional traveling route) of each of the automatic traveling devices 2 is generated, the generation processing unit 113 generates the map data in which the arrangement information of the tags corresponding to the traveling route is set. Here, the generation processing unit 113 generates map data M1 corresponding to AGV1, map data M2 corresponding to AGV2, and map data M3 corresponding to AGV3.

FIG. 9 illustrates an example of the map data M1. As illustrated in FIG. 9, the generation processing unit 113 generates, for AGV1, the map data M1 of the sectional traveling route including the tag ID "0004" (the positional coordinates "P004") and the tag ID "0005" (the positional coordinates "P005") of the code tags Tg.

FIG. 10 illustrates an example of the map data M2. As illustrated in FIG. 10, the generation processing unit 113 generates, for AGV2, the map data M2 of the sectional traveling route including the tag ID "0006" (the positional coordinates "P006") and the tag ID "0007" (the positional coordinates "P007") of the code tags Tg corresponding to the virtual tags. In this way, the generation processing unit 113 sets the positional information (positional coordinates) of the code tag Tg with respect to AGV2 which travels by the guideless method without using the code tag Tg. That is, by using the code tag Tg as a virtual tag, AGV2 travels along the sectional traveling route set by the positional information of the code tag Tg.

FIG. 11 illustrates an example of the map data M3. As illustrated in FIG. 11, the generation processing unit 113 generates, for AGV3, the map data M3 of the sectional traveling route including the tag ID "0001" (the positional coordinates "P001") and the tag ID "0002" (the positional coordinates "P002") of the code tags Tg corresponding to the virtual tags. As described above, the generation processing unit 113 sets the positional information (positional coordinates) of the code tag Tg with respect to AGV3 which travels by the line guide method without using the code tag Tg. That is, by using the code tag Tg as a virtual tag, AGV3 travels along the sectional traveling route set by the positional information of the code tag Tg. Furthermore, the virtual tag corresponding to AGV3 may be the RFID tag Rf. In this case, the generation processing unit 113 may set the positional coordinates of the RFID tag Rf (see FIG. 7) corresponding to the code tag Tg in the map data M3.

As described above, the generation processing unit 113 generates the sectional traveling route using the positional coordinates of the common code tag Tg for the plurality of automatic traveling devices 2 (AGV1, AGV2, and AGV3) having different traveling methods.

The output processing unit 114 outputs the traveling instruction including the traveling route information including the entire traveling route and the sectional traveling route to each of the automatic traveling devices 2. Specifically, the output processing unit 114 outputs the identification information of a plurality of tags (the code tags Tg) corresponding to the sectional traveling route to AGV1, outputs the identification information of a plurality of virtual tags (the code tags Tg) corresponding to the sectional traveling route to AGV2, and outputs the identification information of a plurality of virtual tags (the code tags Tg or the RFID tags Rf) corresponding to the sectional traveling route to AGV3.

For example, the output processing unit 114 outputs the map data M1 (see FIG. 9) to AGV1, outputs the map data M2 (see FIG. 10) to AGV2, and outputs the map data M3 (see FIG. 11) to AGV3.

When acquiring the map data M1, AGV1 travels along the sectional traveling route based on the positional coordinates (P004, P005, etc.) corresponding to the tag (the code tag Tg) included in the map data M1. When acquiring the map data M2, AGV2 travels along the sectional traveling route based on the positional coordinates (P006, P007, etc.) corresponding to the tag (the code tag Tg) included in the map data M2. When acquiring the map data M3, AGV3 travels along the sectional traveling route based on the positional coordinates (P001, P002, etc.) corresponding to the tag (the code tag Tg) included in the map data M3. AGV3 may travel along the sectional traveling route based on the positional coordinates (P101, P102, etc.) (see FIG. 7) of the RFID tag Rf corresponding to the code tag Tg included in the map data M3.

Traveling Process According to First Embodiment

Figure 12:
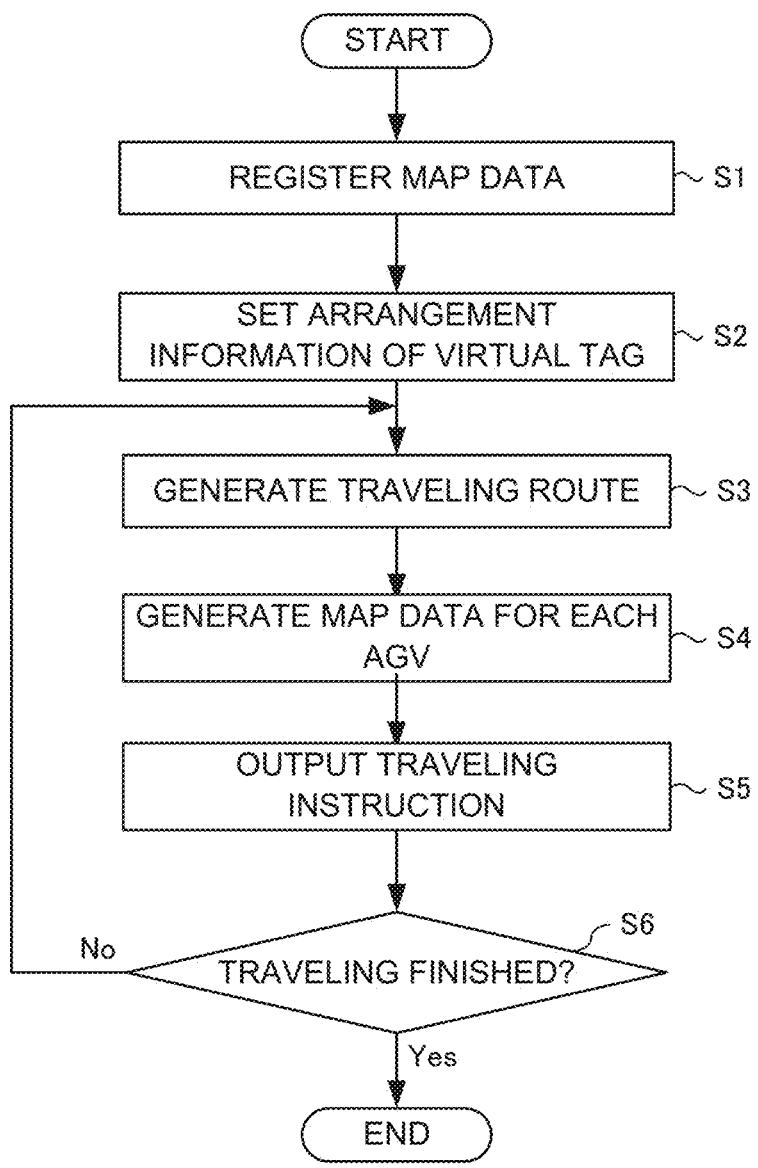
FIG. 12 is a flowchart illustrating an example of a procedure of a traveling process executed by the traveling system according to the first embodiment of the present disclosure.

Hereinafter, the traveling process executed in the traveling system 10 according to the first embodiment will be described with reference to FIG. 12. Specifically, according to the present embodiment, the traveling process is executed by the controller 11 of the management server 1. Further, the controller 11 can execute a plurality of traveling processes in parallel in response to a plurality of transportation requests to the plurality of automatic traveling devices 2. The controller 11 starts execution of the traveling process illustrated in FIG. 12 when the controller 11 causes the automatic traveling device 2 to start a transportation work in response to a transportation request.

Furthermore, the present disclosure can be regarded as the disclosure of a traveling method for executing one or more steps included in the traveling process. Further, one or more steps included in the traveling process described herein may be appropriately omitted. Furthermore, the execution order of the steps in the traveling process may be changed within a range in which the same operation and effect are obtained. Further, here, a case where the controller 11 executes each step in the traveling process will be described as an example, but a traveling method in which one or more processors execute each step in the traveling process in a distributed manner is also considered as another embodiment.

First, in step S1, the controller 11 registers the map data D4 including the arrangement information of a plurality of tags. For example, when the tags (the code tag Tg and the RFID tag Rf) are arranged in the travelable area in the facility W1, the controller 11 generates the map data D4 (see FIG. 7) including the positional coordinates (the X coordinate and the Y coordinate) of each tag and the type (the two-dimensional code or the RFID) of each tag in accordance with the registration operation of the user and registers the map data D4 in the storage 12.

Subsequently, in step S2, the controller 11 sets the arrangement information of the virtual tag. Specifically, the controller 11 sets the arrangement information of a plurality of virtual tags (control points) in the travelable areas of AGV2 and AGV3 in the map data D4. For example, as illustrated in FIG. 7, the controller 11 registers the tag ID of the code tag Tg in association with each of the RFID tags Rf to associate the positional coordinates of the code tag Tg with the RFID tag Rf. Further, the controller 11 registers the tag ID of the code tag Tg in association with the positional coordinates in the travelable area of AGV2 to associate the positional coordinates of the code tag Tg with the positional coordinates in the travelable area of AGV2.

In this way, the controller 11 sets the arrangement information (positional coordinates) of the code tag Tg in the arrangement information of the automatic traveling device 2 that travels by a traveling method (guideless method, line guide method, or the like) different from the tag method. Thus, the automatic traveling device 2 that travels by a traveling method different from the tag method can be controlled to travel by the arrangement information of the code tags Tg. Therefore, the code tag Tg functions as a virtual tag used in the traveling control for the automatic traveling device 2 that travels by a traveling method different from the tag method.

Subsequently, in step S3, the controller 11 generates the traveling route of each of the automatic traveling devices 2. For example, the controller 11 determines whether AGV1, AGV2, and AGV3 interfere with one another based on the positional coordinates of the code tags Tg corresponding to AGV1, AGV2, and AGV3, respectively, and generates the sectional traveling route such that the AGVs do not interfere with one another. Here, the controller 11 generates the sectional traveling route along which AGV1 travels by sequentially following the code tags Tg, the sectional traveling route along which AGV2 travels by sequentially following the virtual tags (the code tags Tg), and the sectional traveling route along which AGV3 travels by sequentially following the virtual tags (the RFID tags Rf).

Subsequently, in step S4, the controller 11 generates the map data for each of the automatic traveling devices 2. Here, the controller 11 generates the map data M1 (see FIG. 9) corresponding to AGV1, the map data M2 (see FIG. 10) corresponding to AGV2, and the map data M3 (see FIG. 11) corresponding to AGV3. For example, the controller 11 sets, in the map data M2 corresponding to AGV2, the positional information (positional coordinates) of the code tags Tg on the sectional traveling route along which AGV2 travels subsequently. Further, the controller 11 sets, in the map data M3 corresponding to AGV3, the positional information (positional coordinates) of the code tags Tg (or the RFID tags Rf) on the sectional traveling route along which AGV3 travels subsequently.

Subsequently, in step S5, the controller 11 outputs a traveling instruction to each of the automatic traveling devices 2. Specifically, the controller 11 outputs the traveling instruction including the traveling route information including the entire traveling route and the sectional traveling route to each of the automatic traveling devices 2. Further, the controller 11 outputs the map data M1 (see FIG. 9) including the identification information of a plurality of tags (the code tags Tg) corresponding to the sectional traveling route to AGV1, outputs the map data M2 (see FIG. 10) including the identification information of a plurality of virtual tags (the code tags Tg) corresponding to the sectional traveling route to AGV2, and outputs the map data M3 (see FIG. 11) including the identification information of a plurality of virtual tags (the code tags Tg or the RFID tags Rf) corresponding to the sectional traveling route to AGV3.

When acquiring the traveling instruction including the map data M1, AGV1 travels along the sectional traveling route based on the positional coordinates (P004, P005, etc.) corresponding to the tag (the code tag Tg) included in the map data M1. When acquiring the traveling instruction including the map data M2, AGV2 travels along the sectional traveling route based on the positional coordinates (P006, P007, etc.) corresponding to the tag (the code tag Tg) included in the map data M2. When acquiring the traveling instruction including the map data M3, AGV3 travels along the sectional traveling route based on the positional coordinates (P001, P002, etc.) corresponding to the tag (the code tag Tg) included in the map data M3.

Subsequently, in step S6, the controller 11 determines whether each of the automatic traveling devices 2 has finished traveling along the traveling route. For example, the controller 11 determines that the traveling has ended when each AGV has finished the traveling process in response to the transportation request. When each AGV has finished traveling along the traveling route, the controller 11 ends the traveling process (S6: Yes).

The controller 11 repeats the process of steps S3 to S5 until each AGV has finished traveling along the traveling route (S6: No). For example, the controller 11 repeatedly executes the process of generating the subsequent sectional traveling route by using the end position of the sectional traveling route as the start position of the subsequent sectional traveling route while AGV1 is traveling along the sectional traveling route, repeatedly executes the process of generating the subsequent sectional traveling route by using the end position of the sectional traveling route as the start position of the subsequent sectional traveling route while AGV2 is traveling along the sectional traveling route, and repeatedly executes the process of generating the subsequent sectional traveling route by using the end position of the sectional traveling route as the start position of the subsequent sectional traveling route while AGV3 is traveling along the sectional traveling route. The controller 11 repeatedly executes the process for each AGV until each AGV reaches the destination position. Each AGV generates the sectional traveling route corresponding to the map data each time AGV accepts the map data from the management server 1.

As described above, the traveling system 10 according to the first embodiment is a traveling system that guides the first automatic traveling device 2 by the first guiding method (tag method) for guiding the first automatic traveling device 2 by detecting a plurality of tags (the code tags Tg) arranged on the floor surface and guides the second automatic traveling device 2 by the second guiding method (the guideless method or the line guide method) different from the first guiding method. Further, the traveling system 10 registers the map data D4 (see FIG. 7) including the arrangement information of a plurality of tags and sets the arrangement information of a plurality of control points (virtual tags) in the travelable area of the second automatic traveling device 2 in the map data D4. Further, the traveling system 10 generates the first traveling route along which the first automatic traveling device 2 travels by sequentially following the tags and the second traveling route along which the second automatic traveling device 2 travels by sequentially following the control points such that the first automatic traveling device 2 and the second automatic traveling device 2 do not interfere with each other.

With the above-described configuration, it is possible to control traveling of the plurality of automatic traveling devices 2 having different guiding methods in the same area.

Second Embodiment

Hereinafter, the traveling system 10 according to the second embodiment of the present disclosure will be described. In the second embodiment, the description of the same configuration as the configuration described in the first embodiment will be appropriately omitted.

In the traveling system according to the related art, the traveling route from the start point to the destination is previously set, and the automatic traveling device is caused to travel along the set traveling route, or when an obstacle is detected, the automatic traveling device is caused to travel along an avoidance route to avoid the obstacle. Here, when a plurality of automatic traveling devices travels in the same area, the traveling route from the start point to the destination of each automatic traveling device needs to be previously set such that the automatic traveling devices do not interfere with each other, which results in an increase in the processing load. Further, when the traveling routes of the respective automatic traveling devices are close to each other, the automatic traveling devices may come into contact with each other. Conversely, as described below, the traveling system 10 according to the second embodiment has a configuration that can cause a plurality of automatic traveling devices to travel while suppressing the processing load and can avoid the contact between the automatic traveling devices.

The traveling system 10 according to the second embodiment is a traveling system that causes each of the plurality of automatic traveling devices 2 to travel based on a detection result obtained by detecting the plurality of tags (the code tags Tg) arranged on the floor surface. That is, the traveling system 10 controls traveling of the plurality of automatic traveling devices 2 by the tag method.

Specifically, the generation processing unit 113 generates the sectional traveling route for each of the automatic traveling devices 2. For example, the generation processing unit 113 generates the sectional traveling route that has a predetermined length and forms a part of the entire traveling route from the current position to the destination position of the first automatic traveling device 2 such that the sectional traveling route of the first automatic traveling device 2 does not overlap with the sectional traveling route generated for the other second automatic traveling device 2. A method for determining the length of the sectional traveling route corresponding to each of the automatic traveling devices 2 will be described in a third embodiment below.

Figure 13:
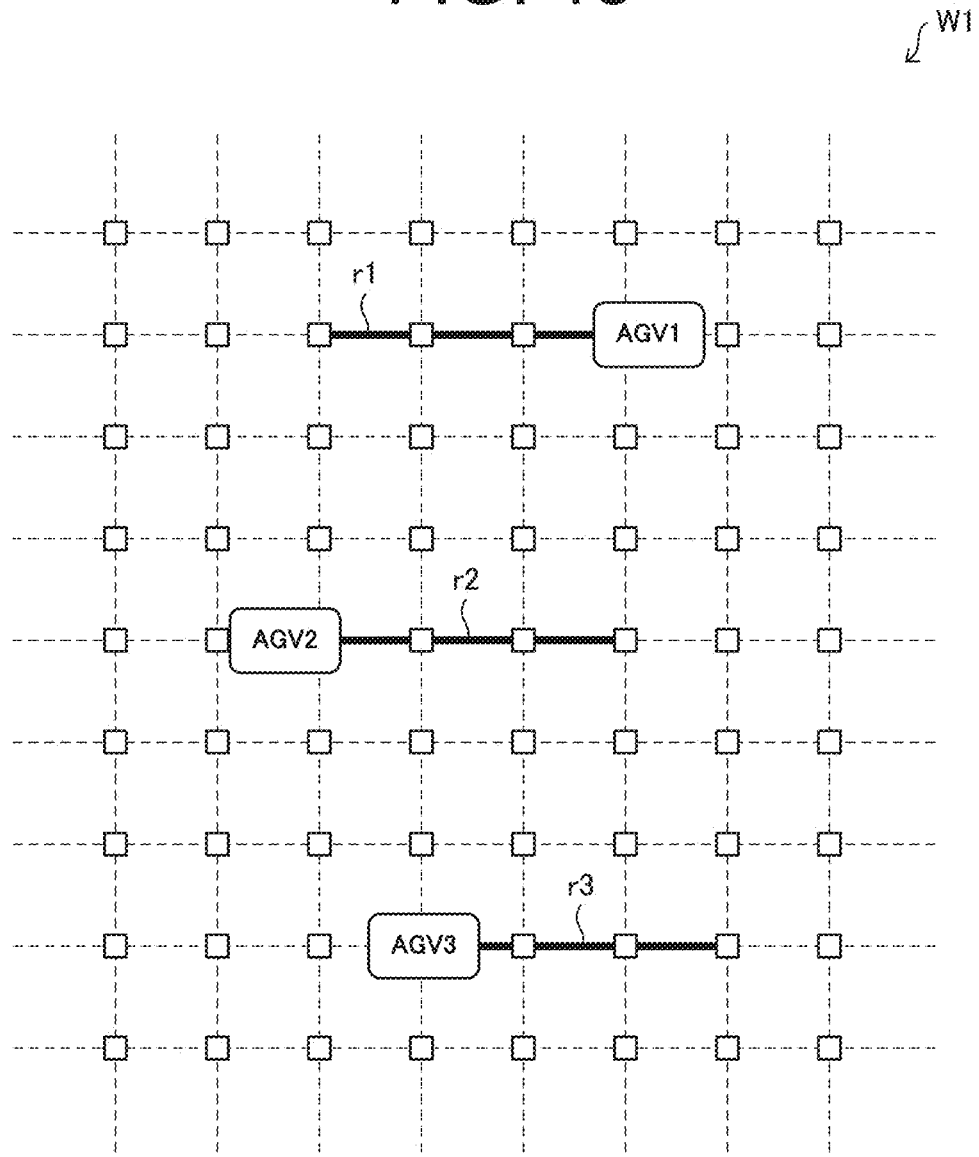
FIG. 13 is a diagram illustrating an example of a sectional traveling route of the automatic traveling device according to a second embodiment of the present disclosure.

The generation processing unit 113 generates the sectional traveling route that has the determined sectional traveling route length from the section start position on the entire traveling route. In FIG. 13, "r1" indicates the sectional traveling route set for AGV1, "r2" indicates the sectional traveling route set for AGV2, and "r3" indicates the sectional traveling route set for AGV3.

Here, for example, when the plurality of automatic traveling devices 2 travel along the sectional traveling routes close to each other, the automatic traveling devices 2 may come into contact with each other.

Figure 14:
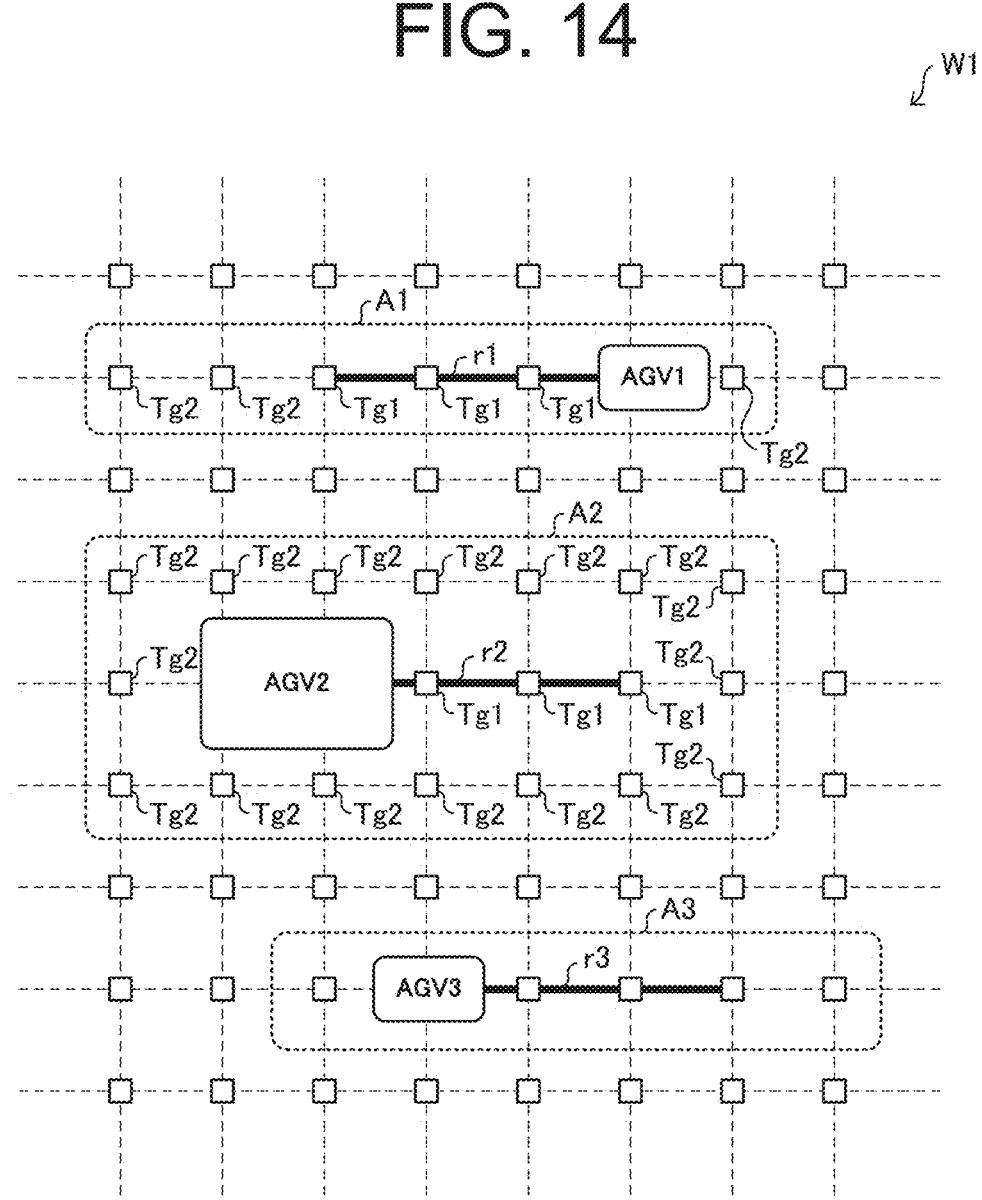
FIG. 14 is a diagram illustrating an example of a method for setting a prohibition point (traveling prohibition tag) according to the second embodiment of the present disclosure.

Therefore, the setting processing unit 112 sets a first tag included in the sectional traveling route generated for the first automatic traveling device 2 and a second tag arranged within a predetermined range from the first tag as prohibition points at which traveling of the second automatic traveling devices 2 is prohibited. For example, as illustrated in FIG. 14, the setting processing unit 112 sets a plurality of code tags Tg1 included in a sectional traveling route r1 generated for AGV1 and a plurality of code tags Tg2 arranged within a predetermined range from the code tags Tg1, respectively, as prohibition points at which traveling of the other AGVs is prohibited. Similarly, the setting processing unit 112 sets, for each of AGV2 and AGV3, a prohibition point at which traveling of the other AGVs is prohibited.

Further, the setting processing unit 112 sets, as the prohibition points, the first tag and the second tag arranged in a predetermined range in accordance with the outer size of the first automatic traveling device 2. For example, as illustrated in FIG. 14, AGV2 has a larger outer size than the other AGVs. In this case, when another AGV travels near AGV2, the AGVs are highly likely to come into contact with each other. Therefore, the setting processing unit 112 sets the plurality of code tags Tg1 included in the sectional traveling route r2 generated for AGV2 and the plurality of code tags Tg2 arranged within a predetermined range (the range surrounded by a dotted line frame) in accordance with the outer size of AGV2 from the code tags Tg1, respectively, as prohibition points at which traveling of the other AGVs is prohibited. The setting processing unit 112 widens the predetermined range as the outer size of the automatic traveling device 2 becomes larger. That is, the setting processing unit 112 sets the larger number of prohibition points as the outer size of the automatic traveling device 2 becomes larger.

As described above, the generation processing unit 113 designates the plurality of first tags and generates the route connecting the plurality of first tags as the sectional traveling route of the automatic traveling device 2. Further, the setting processing unit 112 sets the plurality of first tags and the plurality of second tags arranged within a predetermined range from the first tags, respectively, as prohibition points.

The range formed by the plurality of prohibition points is an entry prohibited area in which entry of other AGVs is prohibited. In the example illustrated in FIG. 14, an entry prohibited area A1 is set for AGV1, an entry prohibited area A2 is set for AGV2, and an entry prohibited area A3 is set for AGV3.

The output processing unit 114 outputs the identification information of the plurality of first tags corresponding to the sectional traveling route and the plurality of second tags arranged within the predetermined range from the first tags, respectively, to each of the plurality of automatic traveling devices 2. More specifically, the output processing unit 114 outputs the map data M11 (see FIG. 15) including the identification information of the plurality of first tags corresponding to the sectional traveling route (the code tags Tg corresponding to the sectional traveling route) and the second tags (the code tags Tg2 corresponding to the prohibition points (traveling prohibition tags)) to AGV1, outputs the map data M12 (see FIG. 16) including the identification information of the plurality of first tags corresponding to the sectional traveling route (the code tags Tg corresponding to the sectional traveling route) and the second tags (the code tags Tg2 corresponding to the prohibition points (traveling prohibition tags)) to AGV2, and outputs the map data M13 (see FIG. 17) including the identification information of the plurality of first tags corresponding to the sectional traveling route (the code tags Tg1 corresponding to the sectional traveling route) and the second tags (the code tags Tg2 corresponding to the prohibition points (traveling prohibition tags)) to AGV3.

When acquiring the map data M11, AGV1 travels along the sectional traveling route based on the positional coordinates corresponding to the first tag included in the map data M11. When acquiring the map data M12, AGV2 travels along the sectional traveling route based on the positional coordinates corresponding to the first tag included in the map data M12. When acquiring the map data M13, AGV3 travels along the sectional traveling route based on the positional coordinates corresponding to the tag included in the map data M13.

As described above, for the plurality of automatic traveling devices 2 (AGV1, AGV2, and AGV3) that travel by the tag method, the controller 11 sets the first tag corresponding to the sectional traveling route and the second tag arranged within the predetermined range from the first tag as the prohibition points at which traveling of the other automatic traveling devices 2 is prohibited, and causes each of the automatic traveling devices 2 to travel along the sectional traveling route corresponding to the first tags.

Traveling Process According to Second Embodiment

Figure 18:
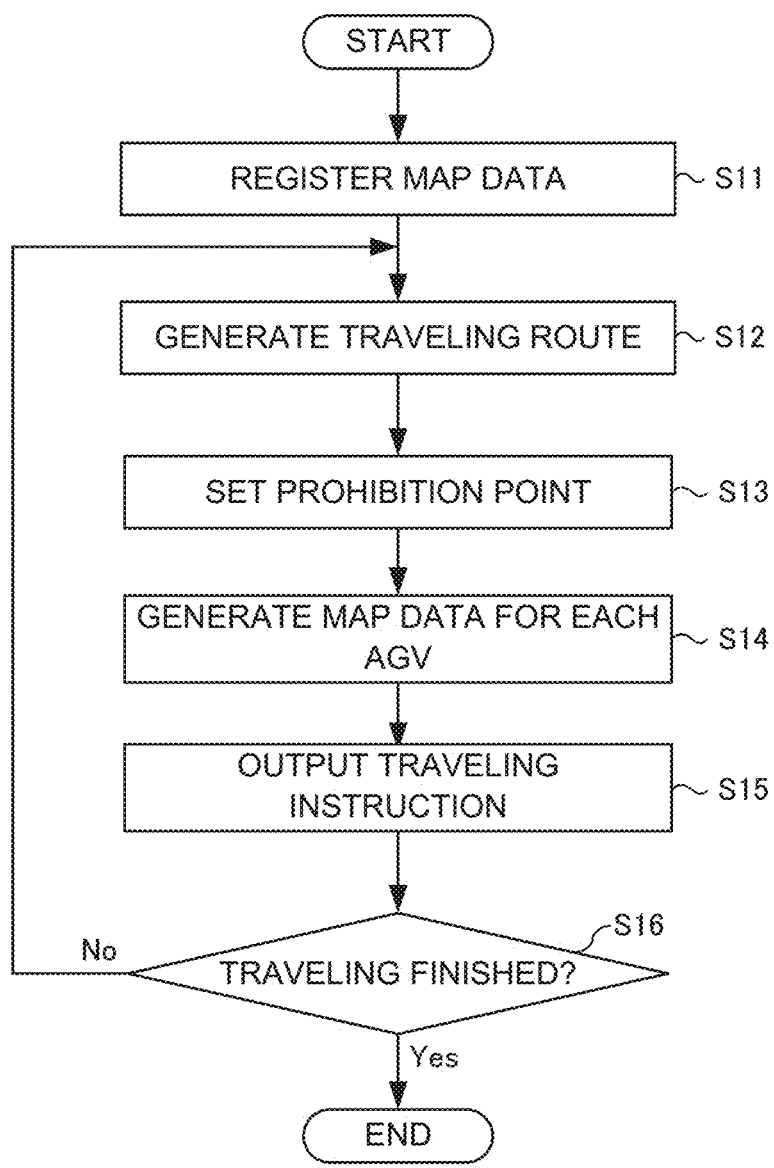
FIG. 18 is a flowchart illustrating an example of a procedure of a traveling process executed by the traveling system according to the second embodiment of the present disclosure.

Hereinafter, the traveling process executed in the traveling system 10 according to the second embodiment will be described with reference to FIG. 18.

First, in step S11, the controller 11 registers the map data D4 including the arrangement information of the plurality of tags. For example, when the tag (the code tag Tg) is arranged in the travelable area in the facility W1, the controller 11 generates the map data including the positional coordinates (the X coordinate and the Y coordinate) of each tag in accordance with the registration operation of the user and registers the map data in the storage 12.

Subsequently, in step S12, the controller 11 generates the traveling route of each of the automatic traveling devices 2. For example, the controller 11 determines whether AGV1, AGV2, and AGV3 interfere with one another based on the positional coordinates of the code tags Tg corresponding to AGV1, AGV2, and AGV3, respectively, and generates the sectional traveling route such that the AGVs do not interfere with one another. For example, the controller 11 generates the sectional traveling route that has a predetermined length and forms a part of the entire traveling route from the current position to the destination position of AGV1 such that the sectional traveling route of AGV1 does not overlap with the sectional traveling route generated for AGV2 and the sectional traveling route generated for AGV3.

Subsequently, in step S13, the controller 11 sets a prohibition point (traveling prohibition tag) at which traveling of the other automatic traveling devices 2 is prohibited. For example, as illustrated in FIG. 14, the controller 11 sets the plurality of code tags Tg1 included in the sectional traveling route r1 generated for AGV1 and the plurality of code tags Tg2 arranged within a predetermined range from the code tags Tg1, respectively, as the prohibition points at which traveling of the other AGVs is prohibited.

Further, the controller 11 sets, as the prohibition points, the first tag corresponding to the sectional traveling route of the automatic traveling device 2 and the second tag arranged in a predetermined range corresponding to the outer size of the automatic traveling device 2. For example, as illustrated in FIG. 14, the controller 11 sets the plurality of code tags Tg1 included in the sectional traveling route r2 generated for AGV2 and the plurality of code tags Tg2 arranged within a predetermined range in accordance with the outer size from the code tags Tg1, respectively, as the prohibition points at which traveling of the other AGVs is prohibited.

Subsequently, in step S14, the controller 11 generates map data for each of the automatic traveling devices 2. Here, the controller 11 generates the map data M11 (see FIG. 15) corresponding to AGV1, the map data M12 (see FIG. 16) corresponding to AGV2, and the map data M13 (see FIG. 17) corresponding to AGV3.

Subsequently, in step S15, the controller 11 outputs the traveling instruction to each of the automatic traveling devices 2. Specifically, the controller 11 outputs the traveling instruction including the traveling route information including the entire traveling route and the sectional traveling route to each of the automatic traveling devices 2. Further, the controller 11 outputs the map data M11 (see FIG. 15) including the identification information of the plurality of tags (the code tags Tg) corresponding to the sectional traveling route to AGV1, outputs the map data M12 (see FIG. 16) including the identification information of the plurality of tags (the code tags Tg) corresponding to the sectional traveling route to AGV2, and outputs the map data M13 (see FIG. 17) including the identification information of the plurality of tags (the code tags Tg) corresponding to the sectional traveling route to AGV3.

When acquiring the traveling instruction including the map data M11, AGV1 travels along the sectional traveling route based on the positional coordinates corresponding to the tag included in the map data M11. When acquiring the traveling instruction including the map data M12, AGV2 travels along the sectional traveling route based on the positional coordinates corresponding to the tag included in the map data M12. When acquiring the traveling instruction including the map data M13, AGV3 travels along the sectional traveling route based on the positional coordinates corresponding to the tag included in the map data M13.

Subsequently, in step S16, the controller 11 determines whether each of the automatic traveling devices 2 has finished traveling along the traveling route. For example, the controller 11 determines that the traveling has ended when each AGV has finished the traveling process in response to the transportation request. When each AGV has finished traveling along the traveling route, the controller 11 finishes the traveling process (S16: Yes).

The controller 11 repeats the process of steps S12 to S15 until each AGV has finished traveling along the traveling route (S16: No). For example, the controller 11 repeatedly executes the process of generating the subsequent sectional traveling route by using the end position of the sectional traveling route as the start position of the subsequent sectional traveling route while AGV1 is traveling along the sectional traveling route, repeatedly executes the process of generating the subsequent sectional traveling route by using the end position of the sectional traveling route as the start position of the subsequent sectional traveling route while AGV2 is traveling along the sectional traveling route, and repeatedly executes the process of generating the subsequent sectional traveling route by using the end position of the sectional traveling route as the start position of the subsequent sectional traveling route while AGV3 is traveling along the sectional traveling route. The controller 11 repeatedly executes the process for each AGV until each AGV reaches the destination position. Each AGV generates the sectional traveling route corresponding to the map data each time the AGV accepts the map data from the management server 1.

As described above, the traveling system 10 according to the second embodiment is a traveling system that causes each of the plurality of automatic traveling devices 2 to travel based on a detection result obtained by detecting a plurality of tags arranged on the floor surface. The traveling system 10 generates the sectional traveling route that has a predetermined length and forms a part of the traveling route from the current position to the destination position of the first automatic traveling device 2 such that the sectional traveling route of the first automatic traveling device 2 does not overlap with the sectional traveling route generated for the other second automatic traveling device 2 and sets the first tag included in the sectional traveling route generated for the first automatic traveling device 2 and the second tag arranged within a predetermined range from the first tag as prohibition points to prohibit traveling of the second automatic traveling device 2. Further, the traveling system 10 sets the first tag included in the sectional traveling route of the first automatic traveling device 2 and the second tag arranged in a predetermined range in accordance with the outer size of the first automatic traveling device 2 as prohibition points.

With the above-described configuration, when the plurality of automatic traveling devices 2 travels in the same area, the sectional traveling route having a predetermined length is generated for each of the automatic traveling devices 2 such that the automatic traveling devices do not interfere with each other, and therefore, it is possible to suppress a processing load as compared to the configuration of the related art in which the entire traveling route from the start point to the destination of each automatic traveling device is generated and updated. Further, with the above-described configuration, since the prohibition point at which the traveling of the other automatic traveling device 2 is prohibited is set in accordance with the traveling route (sectional traveling route) of the automatic traveling device 2, it is possible to avoid contact between the automatic traveling devices when the traveling routes of the respective automatic traveling devices 2 are close to each other.

Third Embodiment

Hereinafter, the traveling system 10 according to a third embodiment of the present disclosure will be described. In the third embodiment, the description of the same configuration as the configuration described in the first embodiment and the second embodiment will be appropriately omitted.

In the traveling system according to the related art, the traveling route from the start point to the destination is previously set, and the automatic traveling device is caused to travel along the set traveling route, or when an obstacle is detected, the automatic traveling device is caused to travel along an avoidance route to avoid the obstacle. Here, when a plurality of automatic traveling devices travels in the same area, the traveling route from the start point to the destination of each automatic traveling device is previously set such that the automatic traveling devices do not interfere with each other. Further, for example, when the traveling route of the first automatic traveling device is set, the traveling route is set as an entry prohibited area in which the entry of other automatic traveling devices is prohibited. In the method according to the related art described above, for example, when the entire traveling route from the start point to the destination corresponding to the first automatic traveling device is set as an entry prohibited area, there are problems in that the travelable areas of the other automatic traveling devices are narrowed and the traveling efficiency of the plurality of automatic traveling devices as a whole is reduced. Conversely, as described below, the traveling system 10 according to the third embodiment has a configuration that can improve the traveling efficiency of the plurality of automatic traveling devices as a whole.

The traveling system 10 according to the third embodiment is a traveling system that causes each of the plurality of automatic traveling devices 2 to travel based on a detection result obtained by detecting a plurality of tags arranged on the floor surface. That is, the traveling system 10 controls traveling of the plurality of automatic traveling devices 2 by the tag method.

Further, the traveling system 10 according to the third embodiment has a configuration to determine the length of the sectional traveling route described in the second embodiment.

The generation processing unit 113 (an example of a determination processing circuit according to the present disclosure) determines the length of the first sectional traveling route forming a part of the first entire traveling route from the current position to the destination position of the first automatic traveling device 2 based on the position of an overlapping tag that overlaps with the plurality of second tags included in the second sectional traveling route set for the second automatic traveling device 2 among the plurality of first tags included in the first entire traveling route.

Specifically, the generation processing unit 113 determines the length of the first sectional traveling route based on the total number of non-overlapping tags that are located between the first tag corresponding to the current position of the first automatic traveling device 2 and the first tag immediately before the overlapping tag and that do not overlap with the second tag. Further, the generation processing unit 113 generates the first sectional traveling route such that the first sectional traveling route does not overlap with the second sectional traveling route set for the second automatic traveling device 2.

Figure 19:
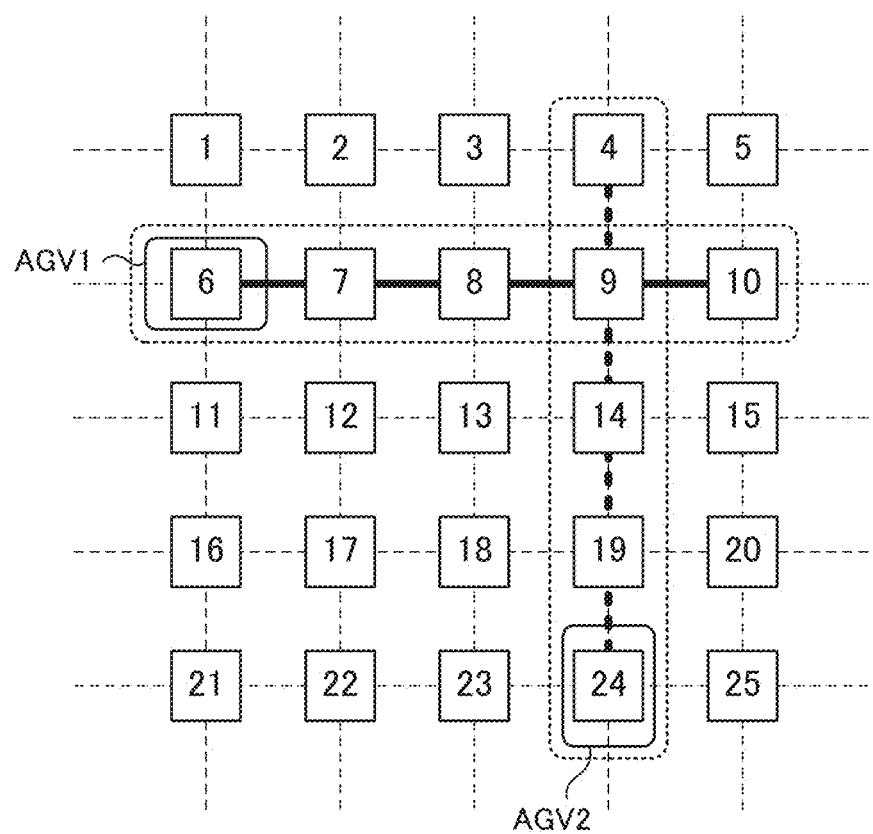
FIG. 19 is a diagram illustrating a method for determining the length of a sectional traveling route of the automatic traveling device according to a third embodiment of the present disclosure.

A specific example will be described with reference to the conceptual diagram of FIG. 19. In the example illustrated in FIG. 19, it is assumed that the sectional traveling route from the tag "6" toward the tag "10" is set for AGV1. The generation processing unit 113 determines the optimal length of the sectional traveling route for the entire traveling route from the tag "24" toward the tag "4" for AGV2. For example, the tag "9" among the tags included in the entire traveling route of AGV2 overlaps with the tag included in the sectional traveling route of AGV1. That is, the tag "9" corresponds to an overlapping tag. In this case, the generation processing unit 113 determines the length of the sectional traveling route of AGV2 based on the total number of non-overlapping tags immediately before the overlapping tag "9". Here, the tags "19" and "14" immediately before the overlapping tag "9" correspond to non-overlapping tags. Therefore, the generation processing unit 113 determines the length (the length corresponding to two tags) of the sectional traveling route of AGV2 based on the positions of the two tags.

When the plurality of automatic traveling devices 2 is included in the same area (here, in the facility W1), the generation processing unit 113 sequentially executes the process of determining the length of the sectional traveling route for each of the plurality of automatic traveling devices 2. For example, after determining the length of the sectional traveling route of AGV1, the generation processing unit 113 then determines the length of the sectional traveling route of AGV2 based on the sectional traveling route of AGV1, and then determines the length of the sectional traveling route of AGV3 based on the sectional traveling route of AGV1 and the sectional traveling route of AGV2.

Here, the generation processing unit 113 may execute the process of determining the length of the sectional traveling route for each of the plurality of automatic traveling devices 2 in order according to the priority.

For example, the generation processing unit 113 executes the process of determining the length of the sectional traveling route in descending order of the outer size of the automatic traveling device 2. That is, the generation processing unit 113 determines the order of the automatic traveling devices 2 that determines the length of the sectional traveling route based on the priority of the outer size. Accordingly, for example, since the sectional traveling route of the large-sized automatic traveling device 2 having a large outer size can be set to be long, the large-sized automatic traveling device 2 can be caused to preferentially travel.

According to another embodiment, the generation processing unit 113 may execute the process of determining the length of the sectional traveling route in order in which the traveling instruction (transportation request) is output to each of the plurality of automatic traveling devices 2. For example, when the transportation requests are output in the order of AGV1, AGV2, and AGV3, the generation processing unit 113 first determines the length of the sectional traveling route of AGV1, then determines the length of the sectional traveling route of AGV2 based on the sectional traveling route of AGV1, and finally determines the length of the sectional traveling route of AGV3 based on the sectional traveling route of AGV1 and the sectional traveling route of AGV2. Thus, for example, since the sectional traveling route of the automatic traveling device 2 to which the transportation request is output first can be set to be long, the automatic traveling device 2 can be caused to preferentially travel.

When the generation processing unit 113 generates the sectional traveling route of the first automatic traveling device 2, the setting processing unit 112 sets the sectional traveling route set for the first automatic traveling device 2 as an entry prohibited area where the entry of the other automatic traveling devices 2 is prohibited.

Figure 20:
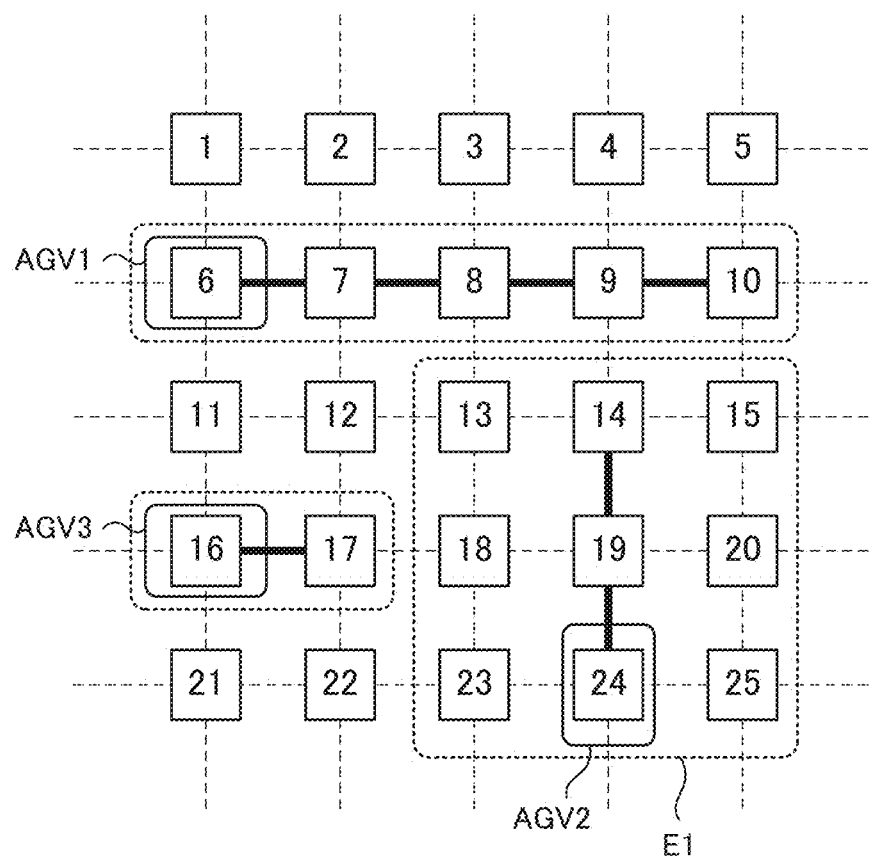
FIG. 20 is a diagram illustrating a method for determining the length of a sectional traveling route of the automatic traveling device according to the third embodiment of the present disclosure.

Further, the setting processing unit 112 sets the entry prohibited area in accordance with the outer size of the automatic traveling device 2. For example, as illustrated in FIG. 20, when the outer size of AGV2 is large, the setting processing unit 112 sets a tag positioned within a predetermined range from the tag included in the sectional traveling route as a traveling prohibition tag and sets an entry prohibited area E1.

When the entry prohibited area E1 is set, the generation processing unit 113 generates the sectional traveling route of the other automatic traveling device 2 based on a non-overlapping tag at a position that does not overlap with the tag included in the entry prohibited area. For example, as illustrated in FIG. 20, the generation processing unit 113 determines the length of the sectional traveling route of AGV3 based on the total number of non-overlapping tags immediately before the overlapping tag "18" for AGV3. Here, the tag "17" immediately before the overlapping tag "18" corresponds to a non-overlapping tag. Therefore, the generation processing unit 113 determines the length (the length corresponding to one tag) of the sectional traveling route of AGV3 based on the position of one tag.

When determining the length of the first sectional traveling route of the first automatic traveling device 2, the generation processing unit 113 sets the first sectional traveling route as a traveling route along which the first automatic traveling device 2 is to travel subsequently.

The traveling process executed in the traveling system 10 according to the third embodiment is the same as the traveling process (see FIG. 18) executed in the traveling system 10 according to the second embodiment, except for the process of determining the length of the sectional traveling route.

In the traveling process executed in the traveling system 10 according to the third embodiment, the controller 11 determines the length of the first sectional traveling route based on the total number of non-overlapping tags that are located between the first tag corresponding to the current position of the first automatic traveling device 2 and the first tag immediately before the overlapping tag and that do not overlap with the second tag in the process (corresponding to step S12 in FIG. 18) of generating the traveling route (sectional traveling route). The controller 11 sequentially determines the length of the sectional traveling route for each of the plurality of automatic traveling devices 2.

As described above, the traveling system 10 according to the third embodiment is a traveling system that causes each of the plurality of automatic traveling devices 2 to travel based on a detection result obtained by detecting the plurality of tags arranged on the floor surface. The traveling system 10 determines the length of the first sectional traveling route forming a part of the first entire traveling route from the current position to the destination position of the first automatic traveling device 2 based on the position of the overlapping tag that overlaps with the plurality of second tags included in the second sectional traveling route set for the second automatic traveling device 2 among the plurality of first tags included in the first entire traveling route and sets the first sectional traveling route having the determined length as the traveling route along which the first automatic traveling device 2 is to travel subsequently.

With the above-described configuration, since the sectional traveling route having an appropriate length can be generated for each of the automatic traveling devices 2, it is possible to improve the traveling efficiency of the plurality of automatic traveling devices as a whole.

The traveling system 10 according to the third embodiment may include the automatic traveling device 2 by the guideless method and the automatic traveling device 2 by the line guide method. In this case, the controller 11 determines the length of the sectional traveling route of each of the automatic traveling devices 2 based on the position of the code tag Tg corresponding to the virtual tag.

According to another embodiment, the generation processing unit 113 may determine the length of the sectional traveling route based on the information about a portion within a preset determination length from the section start position in the entire traveling route. For example, the generation processing unit 113 can adopt any one of the following first to fifth determination methods. Further, the generation processing unit 113 may combine any one of the following first to fifth determination methods with the above-described determination method.

First Determination Method

In a first determination method, the position of a specific intersection at which the plurality of automatic traveling devices 2 is highly likely to intersect with each other among the plurality of intersections at which the plurality of paths intersect with each other is previously registered. Then, the generation processing unit 113 sets a first length as the sectional traveling route length when the specific intersection does not exist in the portion within the determination length from the section start position in the entire traveling route and sets a second length shorter than the first length as the sectional traveling route length when the specific intersection exists within the determination length from the section start position.

Second Determination Method

In a second determination method, in the plurality of paths, a high-speed traveling path along which the automatic traveling device 2 travels at a high speed and a low-speed traveling path along which the automatic traveling device 2 travels at a low speed are previously registered. Then, the generation processing unit 113 sets a first length as the sectional traveling route length when the low-speed traveling path is not included in the portion within the determination length from the section start position in the entire traveling route and sets a second length shorter than the first length as the sectional traveling route length when the low-speed traveling path is included in the portion within the determination length from the section start position.

Third Determination Method

In a third determination method, a high-speed traveling area in which the automatic traveling device 2 travels at a high speed and a low-speed traveling area in which the automatic traveling device 2 travels at a low speed are previously registered. Then, the generation processing unit 113 sets a first length as the sectional traveling route length when the portion within the determination length from the section start position in the entire traveling route is not included in the low-speed traveling area and sets a second length shorter than the first length as the sectional traveling route length when the portion within the determination length from the section start position is included in the low-speed traveling area.

Fourth Determination Method

In a fourth determination method, the generation processing unit 113 sets a first length as the sectional traveling route length when a right/left turn point does not exist in the portion within the determination length from the section start position in the entire traveling route and sets a second length shorter than the first length as the sectional traveling route length when the right/left turn point exists in the portion within the determination length from the section start position.

Fifth Determination Method

In a fifth determination method, the generation processing unit 113 determines a high-density area in which the probability of occurrence of crossing is higher than a threshold based on the current positions of all the automatic traveling devices 2. Then, the generation processing unit 113 sets a first length as the sectional traveling route length when the portion within the determination length from the section start position is not included in the high-density area in the entire traveling route and sets a second length shorter than the first length as the sectional traveling route length when the portion within the determination length from the section start position is included in the high-density area.

The generation processing unit 113 may determine the length of the sectional traveling route (sectional traveling route length) by any of the methods described above.

Fourth Embodiment

Hereinafter, the traveling system 10 according to a fourth embodiment of the present disclosure will be described. According to the fourth embodiment, the description of the same configuration as the configuration described in the first embodiment, the second embodiment, and the third embodiment will be appropriately omitted.

Furthermore, in the traveling system according to the related art, when a plurality of automatic traveling devices travels in the same area, for example, a specific automatic traveling device may temporarily stop on the traveling route. In this case, there is a problem in that, when the automatic traveling device stops at an arbitrary position, the automatic traveling device interferes with the traveling of the other automatic traveling devices. Conversely, as described below, the traveling system 10 according to the fourth embodiment has a configuration that can appropriately set the stop position when the automatic traveling device is stopped so as not to interfere with the traveling of each automatic traveling device.

The traveling system 10 according to the fourth embodiment is a traveling system that causes each of the plurality of automatic traveling devices 2 to travel based on a detection result obtained by detecting a plurality of tags (the code tags Tg) arranged on the floor surface. That is, the traveling system 10 controls traveling of the plurality of automatic traveling devices 2 by the tag method.

As in the second embodiment, the generation processing unit 113 generates the sectional traveling route that has a predetermined length and forms a part of the entire traveling route from the current position to the destination position of the first automatic traveling device 2 such that the sectional traveling route of the first automatic traveling device 2 does not overlap with the sectional traveling route generated for the other second automatic traveling device 2.

The setting processing unit 112 sets, for each of the plurality of tags, the control information indicating whether to allow or prohibit stopping of the automatic traveling device 2 at the tag. Specifically, the setting processing unit 112 sets the control information indicating whether to allow or prohibit stopping at a predetermined tag based on a determination result of whether the automatic traveling device 2 interferes with the traveling of the other automatic traveling devices 2 when the automatic traveling device 2 stops at the tag.

For example, the setting processing unit 112 registers map data D5 including the control information of a plurality of tags. FIG. 21 illustrates an example of the map data D5. As illustrated in FIG. 21, the setting processing unit 112 registers, for each tag, the type of the AGV that is stoppable (is allowed to stop) at the tag. The type of the AGV registered in the map data D5 is an example of the control information.

For example, the setting processing unit 112 allows a small-sized AGV having a small outer size to stop at all the tags and allows a large-sized AGV having a large outer size to stop at only some tags. The outer size is not limited to two types and may be three or more types.

In this way, the setting processing unit 112 sets the control information in accordance with the outer size of the automatic traveling device 2.

Further, the setting processing unit 112 sets the control information such that the interval between the tags at which the automatic traveling device 2 is stoppable is wider than a reference value larger than the outer size of the automatic traveling device 2. The reference value is a value obtained by adding a predetermined margin to the outer size of the automatic traveling device 2. By adding the margin, for example, when large-sized AGVs stop adjacent to each other, it is possible to reliably prevent the AGVs from coming into contact with each other.

Further, the setting processing unit 112 sets the control information such that the larger the outer size of the automatic traveling device 2 is, the wider the interval between the tags at which the automatic traveling device 2 is stoppable is. For example, when a plurality of large-sized AGVs is caused to travel in the facility W1, the tags at which the AGVs is stoppable are set such that the interval between the tags at which the AGVs is stoppable becomes wide.

Further, the setting processing unit 112 sets the control information such that the interval between the tags in which the automatic traveling device 2 having a first outer size (for example, a large size) is stoppable is wider than the interval between the tags in which the automatic traveling device 2 having a second outer size (for example, a small size) smaller than the first outer size is stoppable. For example, the setting processing unit 112 sets, for the tags in a first group among the plurality of tags, the control information to allow stopping of the automatic traveling device 2 having the second outer size (small size) and prohibit stopping of the automatic traveling device 2 having the first outer size (large size). Further, the setting processing unit 112 sets, for the tags in a second group among the plurality of tags, the control information to allow stopping of the automatic traveling device 2 having the second outer size (small size) and allow stopping of the automatic traveling device 2 having the first outer size (large size). As described above, the setting processing unit 112 sets the control information for each tag such that the number of tags at which the small-sized automatic traveling device 2 is stoppable increases and the number of tags at which the large-sized automatic traveling device 2 is stoppable decreases. For example, the setting processing unit 112 may allow stopping of the small-sized automatic traveling device 2 at all the tags arranged in the facility W1 and may allow stopping of the large-sized automatic traveling device 2 at some of all the tags.

In this way, the setting processing unit 112 sets the control information for each of the plurality of tags arranged in the facility W1.

The generation processing unit 113 generates the sectional traveling route based on the control information. For example, the generation processing unit 113 determines the length of the sectional traveling route such that the tag at the end position of the sectional traveling route does not match the tag (stop prohibition tag) prohibiting stopping of the automatic traveling device 2. Specifically, when the tag at the end position of the sectional traveling route matches the stop prohibition tag, the generation processing unit 113 shortens the length of the sectional traveling route to a position at which the tag at the end position of the sectional traveling route matches a stop allowance tag. Accordingly, it is possible to avoid a situation in which the automatic traveling device 2 travels along the sectional traveling route and stops at the stop prohibition tag.

Traveling Process According to Fourth Embodiment

Hereinafter, the traveling process executed in the traveling system 10 according to the fourth embodiment will be described with reference to FIG. 22.

First, in step S31, the controller 11 registers the map data D4 including the arrangement information of a plurality of tags. For example, when the tag (the code tag Tg) is arranged in the travelable area in the facility W1, the controller 11 generates the map data including the positional coordinates (X coordinate and Y coordinate) of each tag in accordance with the registration operation of the user and registers the map data in the storage 12.

Subsequently, in step S32, the controller 11 sets the control information of the tag. Specifically, the controller 11 sets the control information indicating whether to allow or prohibit stopping in a predetermined tag based on a determination result as to whether the automatic traveling device 2 interferes with the traveling of the other automatic traveling devices 2 when the automatic traveling device 2 stops at the tag. For example, as illustrated in FIG. 21, the controller 11 registers, for each of the tags arranged in the facility W1, the type of the AGV that is stoppable (allowed to be stopped) in the tag.

Subsequently, in step S33, the controller 11 generates the traveling route of each of the automatic traveling devices 2. For example, the controller 11 determines whether AGV1, AGV2, and AGV3 interfere with one another based on the positional coordinates of the code tags Tg corresponding to AGV1, AGV2, and AGV3, respectively, and generates the sectional traveling route such that the AGVs do not interfere with one another. For example, the controller 11 generates the sectional traveling route that has a predetermined length and forms a part of the entire traveling route from the current position to the destination position of AGV1 such that the sectional traveling route of AGV1 does not overlap with the sectional traveling route generated for AGV2 and the sectional traveling route generated for AGV3.

Further, the controller 11 determines the length of the sectional traveling route such that the tag at the end position of the sectional traveling route does not match the tag (stop prohibition tag) at which stopping of the automatic traveling device 2 is prohibited. Specifically, when the tag at the end position of the sectional traveling route matches the stop prohibition tag, the controller 11 shortens the length of the sectional traveling route to a position at which the tag at the end position of the sectional traveling route matches the stop allowance tag. In this way, the controller 11 generates the sectional traveling route such that the AGVs do not interfere with each other and the tag at the end position of the sectional traveling route does not match the stop prohibition tag. Furthermore, the controller 11 may add, to the process in step S33, the process of the configuration described above in the third embodiment to determine the length of the sectional traveling route.

Subsequently, in step S34, the controller 11 generates the map data for each of the automatic traveling devices 2. Here, the controller 11 may execute the process of setting the prohibition point (traveling prohibition tag) described above in the second embodiment. In this case, the controller 11 generates the map data M11 (see FIG. 15) corresponding to AGV1, the map data M12 (see FIG. 16) corresponding to AGV2, and the map data M13 (see FIG. 17) corresponding to AGV3.

Subsequently, in step S35, the controller 11 outputs the traveling instruction to each of the automatic traveling devices 2. Specifically, the controller 11 outputs the traveling instruction including the traveling route information including the entire traveling route and the sectional traveling route to each of the automatic traveling devices 2. Further, the controller 11 outputs the map data M11 (see FIG. 15) including the identification information of the plurality of tags (the code tags Tg) corresponding to the sectional traveling route to AGV1, outputs the map data M12 (see FIG. 16) including the identification information of the plurality of tags (the code tags Tg) corresponding to the sectional traveling route to AGV2, and outputs the map data M13 (see FIG. 17) including the identification information of the plurality of tags (the code tags Tg) corresponding to the sectional traveling route to AGV3.

When acquiring the traveling instruction including the map data M11, AGV1 travels along the sectional traveling route based on the positional coordinates corresponding to the tag included in the map data M11. When acquiring the traveling instruction including the map data M12, AGV2 travels along the sectional traveling route based on the positional coordinates corresponding to the tag included in the map data M12. When acquiring the traveling instruction including the map data M13, AGV3 travels along the sectional traveling route based on the positional coordinates corresponding to the tag included in the map data M13.

Subsequently, in step S36, the controller 11 determines whether each of the automatic traveling devices 2 has finished traveling along the traveling route. For example, the controller 11 determines that the traveling has ended when each AGV has finished the traveling process in response to the transportation request. When each AGV has finished traveling along the traveling route, the controller 11 finishes the traveling process (S36: Yes).

The controller 11 repeats the process of steps S33 to S35 until each AGV has finished traveling along the traveling route (S36: No). For example, the controller 11 repeatedly executes the process of generating the subsequent sectional traveling route by using the end position of the sectional traveling route as the start position of the subsequent sectional traveling route while AGV1 is traveling along the sectional traveling route, repeatedly executes the process of generating the subsequent sectional traveling route by using the end position of the sectional traveling route as the start position of the subsequent sectional traveling route while AGV2 is traveling along the sectional traveling route, and repeatedly executes the process of generating the subsequent sectional traveling route by using the end position of the sectional traveling route as the start position of the subsequent sectional traveling route while AGV3 is traveling along the sectional traveling route. The controller 11 repeatedly executes the process for each AGV until each AGV reaches the destination position. Each AGV generates the sectional traveling route corresponding to the map data each time the AGV accepts the map data from the management server 1.

As described above, the traveling system 10 according to the fourth embodiment is a traveling system that causes each of the plurality of automatic traveling devices 2 to travel based on a detection result obtained by detecting a plurality of tags arranged on the floor surface. Further, the traveling system 10 generates the sectional traveling route that has a predetermined length and forms a part of the traveling route from the current position to the destination position of the automatic traveling device 2 such that the sectional traveling route of the automatic traveling device 2 does not overlap with the sectional traveling route set for the other automatic traveling devices 2 and sets, for each of the plurality of tags, the control information indicating whether to allow or prohibit stopping of the automatic traveling device 2 at the tag. Further, the traveling system 10 sets the control information in accordance with the outer size of the automatic traveling device 2.

With the above configuration, it is possible to appropriately set the stop position when the automatic traveling device 2 is stopped so as not to interfere with the traveling of each of the automatic traveling devices 2. Accordingly, in a case where the plurality of automatic traveling devices 2 travels in the same area, even when the specific automatic traveling device 2 temporarily stops on the traveling route, it is possible to prevent the interference with the traveling of the other automatic traveling devices 2.

The traveling system 10 according to the fourth embodiment may include the automatic traveling device 2 by the guideless method and the automatic traveling device 2 by the line guide method. In this case, the controller 11 sets the control information for the virtual tag.

Further, the traveling system 10 according to the present disclosure may have a form in which at least two or more embodiments among the above-described first to fourth embodiments are combined.

APPENDIX 1 OF DISCLOSURE

Hereinafter, the outline of the disclosure extracted from the above-described first embodiment will be appended. Furthermore, the configurations and processing functions described in the following appendixes can be selected and arbitrarily combined.

APPENDIX 1

A traveling system that guides a first automatic traveling device by a first guiding method for guiding the first automatic traveling device by detecting a plurality of tags arranged on a floor surface and guides a second automatic traveling device by a second guiding method different from the first guiding method, the traveling system comprising:
  a registration processing circuit that registers map data including arrangement information of the plurality of tags;
  a setting processing circuit that sets arrangement information of a plurality of control points in a travelable area of the second automatic traveling device in the map data; and
  a generation processing circuit that generates a first traveling route along which the first automatic traveling device travels by sequentially following the tags and a second traveling route along which the second automatic traveling device travels by sequentially following the control points such that the first automatic traveling device and the second automatic traveling device do not interfere with each other.

APPENDIX 2

The traveling system according to appendix 1, wherein the generation processing circuit determines whether the first automatic traveling device and the second automatic traveling device interfere with each other when the first automatic traveling device is located at a position of any of the plurality of tags and the second automatic traveling device is located at a position of any of the plurality of control points.

APPENDIX 3

The traveling system according to appendix 1 or 2, wherein the generation processing circuit generates the first traveling route that has a predetermined length and forms a part of a traveling route from a current position to a destination position of the first automatic traveling device such that the first traveling route does not overlap with the second traveling route of the second automatic traveling device.

APPENDIX 4

The traveling system according to appendix 3, wherein the generation processing circuit generates the second traveling route by setting the control point included in a predetermined range in which the interference is likely to occur from the tag corresponding to the first traveling route as a prohibition point at which traveling of the second automatic traveling device is prohibited.

APPENDIX 5

The traveling system according to appendix 3 or 4, wherein the generation processing circuit
  repeatedly executes a process of generating the subsequent first traveling route by using an end position of the first traveling route as a start position of the subsequent first traveling route while the first automatic traveling device is traveling along the first traveling route, and
  repeatedly executes a process of generating the subsequent second traveling route by using an end position of the second traveling route as a start position of the subsequent second traveling route while the second automatic traveling device is traveling along the second traveling route.

APPENDIX 6

The traveling system according to any one of appendixes 1 to 5, further comprising an output processing circuit that outputs identification information of the plurality of tags corresponding to the first traveling route to the first automatic traveling device and outputs identification information of the plurality of control points corresponding to the second traveling route to the second automatic traveling device.

APPENDIX 7

The traveling system according to any one of appendixes 1 to 6, wherein the second guiding method is at least any of a guiding method for guiding the second automatic traveling device by causing the second automatic traveling device to travel along a linear guide member arranged along a route on a floor surface based on a detection result obtained by detecting the guide member and a guiding method for guiding the second automatic traveling device based on a self-position estimated on the basis of measurement data of a surrounding environment.

APPENDIX 2 OF DISCLOSURE

Hereinafter, the outline of the disclosure extracted from the above-described second embodiment will be appended. Furthermore, the configurations and processing functions described in the following appendix can be selected and arbitrarily combined.

APPENDIX 1

A traveling system that causes each of a plurality of automatic traveling devices to travel based on a detection result obtained by detecting a plurality of tags arranged on a floor surface, the traveling system comprising:
- a generation processing circuit that generates a sectional traveling route that has a predetermined length and forms a part of a traveling route from a current position to a destination position of a first automatic traveling device such that the sectional traveling route of the first automatic traveling device does not overlap with the sectional traveling route generated for the other second automatic traveling device; and
- a setting processing circuit that sets a first tag included in the sectional traveling route generated for the first automatic traveling device and a second tag arranged within a predetermined range from the first tag as prohibition points at which traveling of the second automatic traveling device is prohibited.

APPENDIX 2

The traveling system according to appendix 1, wherein the setting processing circuit sets, as the prohibition points, the first tag corresponding to the sectional traveling route of the first automatic traveling device and the second tag arranged in the predetermined range in accordance with an outer size of the first automatic traveling device.

APPENDIX 3

The traveling system according to appendix 2, wherein the setting processing circuit widens the predetermined range as the outer size of the first automatic traveling device becomes larger.

APPENDIX 4

The traveling system according to any one of appendixes 1 to 3, wherein
- the generation processing circuit designates a plurality of the first tags and generates a route connecting the plurality of the first tags as the sectional traveling route of the first automatic traveling device, and
- the setting processing circuit sets, as the prohibition points, the plurality of the first tags and a plurality of the second tags arranged within the predetermined range from the plurality of the first tags, respectively.

APPENDIX 5

The traveling system according to any one of appendixes 1 to 4, further comprising an output processing circuit that outputs, to each of the plurality of automatic traveling devices, identification information of a plurality of the first tags corresponding to the sectional traveling route and a plurality of the second tags arranged within the predetermined range from the plurality of the first tags, respectively.

APPENDIX 6

The traveling system according to any one of appendixes 1 to 5, wherein the generation processing circuit repeatedly executes a process of generating a subsequent second sectional traveling route by using an end position of the first sectional traveling route as a start position of the second sectional traveling route while the first automatic traveling device is traveling along a first sectional traveling route.

APPENDIX 3 OF DISCLOSURE

Hereinafter, the outline of the disclosure extracted from the above-described third embodiment will be appended. Furthermore, the configurations and processing functions described in the following appendix can be selected and arbitrarily combined.

APPENDIX 1

A traveling system that causes each of a plurality of automatic traveling devices to travel based on a detection result obtained by detecting a plurality of tags arranged on a floor surface, the traveling system comprising:
- a determination processing circuit that determines a length of a first sectional traveling route forming a part of a first traveling route from a current position to a destination position of a first automatic traveling device based on a position of an overlapping tag that overlaps with a plurality of second tags included in a second sectional traveling route set for a second automatic traveling device among a plurality of first tags included in the first traveling route; and
- a generation processing circuit that sets the first sectional traveling route having the length determined by the determination processing circuit as a traveling route along which the first automatic traveling device is to travel subsequently.

APPENDIX 2

The traveling system according to appendix 1, wherein the determination processing circuit determines the length of the first sectional traveling route based on a total number of non-overlapping tags that are located between the first tag corresponding to a current position of the first automatic traveling device and the first tag immediately before the overlapping tag and that do not overlap with the second tag.

APPENDIX 3

The traveling system according to appendix 1 or 2, wherein the generation processing circuit generates the first sectional traveling route such that the first sectional traveling route does not overlap with the second sectional traveling route set for the second automatic traveling device.

APPENDIX 4

The traveling system according to any one of appendixes 1 to 3, wherein the determination processing circuit sequentially executes a process of determining the length of the sectional traveling route for each of the plurality of automatic traveling devices.

APPENDIX 5

The traveling system according to appendix 4, wherein the determination processing circuit executes the process of determining the length of the sectional traveling route for each of the plurality of automatic traveling devices in order according to priority.

APPENDIX 6

The traveling system according to appendix 5, wherein the determination processing circuit executes the process of determining the length of the sectional traveling route in descending order of an outer size of the automatic traveling device.

APPENDIX 7

The traveling system according to appendix 5 or 6, wherein the determination processing circuit executes the process of determining the length of the sectional traveling route in order in which a traveling instruction is output to each of the plurality of automatic traveling devices.

APPENDIX 8

The traveling system according to any one of appendixes 1 to 7, further comprising a setting processing circuit that sets the first sectional traveling route set for the first automatic traveling device as an entry prohibited area where entry of the other automatic traveling devices is prohibited.

APPENDIX 4 OF DISCLOSURE

Hereinafter, the outline of the disclosure extracted from the above-described fourth embodiment will be appended. Furthermore, the configurations and processing functions described in the following appendix can be selected and arbitrarily combined.

APPENDIX 1

A traveling system that causes each of a plurality of automatic traveling devices to travel based on a detection result obtained by detecting a plurality of tags arranged on a floor surface, the traveling system comprising:

a generation processing circuit that generates a sectional traveling route that has a predetermined length and forms a part of a traveling route from a current position to a destination position of the automatic traveling device such that the sectional traveling route of the automatic traveling device does not overlap with the sectional traveling route set for the other automatic traveling device; and a setting processing circuit that sets, for each of the plurality of tags, control information indicating whether to allow or prohibit stopping of the automatic traveling device at the tag.

APPENDIX 2

The traveling system according to appendix 1, wherein the setting processing circuit sets the control information in accordance with an outer size of the automatic traveling device.

APPENDIX 3

The traveling system according to appendix 2, wherein the setting processing circuit sets the control information such that an interval between the tags at which the automatic traveling device is stoppable is wider than a reference value larger than the outer size of the automatic traveling device.

APPENDIX 4

The traveling system according to appendix 2 or 3, wherein the setting processing circuit sets the control information such that an interval between the tags at which the automatic traveling device is stoppable becomes wider as the outer size of the automatic traveling device becomes larger.

APPENDIX 5

The traveling system according to any one of appendixes 2 to 4, wherein the setting processing circuit sets the control information such that an interval between the tags at which the automatic traveling device having a first outer size is stoppable is wider than an interval between the tags at which the automatic traveling device having a second outer size smaller than the first outer size is stoppable.

APPENDIX 6

The traveling system according to appendix 5, wherein the setting processing circuit
sets the control information to allow stopping of the automatic traveling device having the second outer size and prohibit stopping of the automatic traveling device having the first outer size in a first group of tags among the plurality of tags, and
sets the control information to allow stopping of the automatic traveling device having the second outer size and allow stopping of the automatic traveling device having the first outer size in a second group of tags among the plurality of tags.

APPENDIX 7

The traveling system according to any one of appendixes 1 to 6, wherein the setting processing circuit sets the control information for each of the plurality of tags.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. A traveling system that guides a first automatic traveling device by a first guiding method for guiding the first automatic traveling device by detecting a plurality of tags arranged on a floor surface and guides a second automatic traveling device by a second guiding method different from the first guiding method, the traveling system comprising:
   a registration processing circuit that registers map data including arrangement information of the plurality of tags;
   a setting processing circuit that sets arrangement information of a plurality of control points in a travelable area of the second automatic traveling device in the map data; and
   a generation processing circuit that generates a first traveling route along which the first automatic traveling device travels by sequentially following the tags and a second traveling route along which the second automatic traveling device travels by sequentially following the control points such that the first automatic traveling device and the second automatic traveling device do not interfere with each other.

2. The traveling system according to claim 1, wherein the generation processing circuit determines whether the first automatic traveling device and the second automatic traveling device interfere with each other when the first automatic traveling device is located at a position of any of the plurality of tags and the second automatic traveling device is located at a position of any of the plurality of control points.

3. The traveling system according to claim 1, wherein the generation processing circuit generates the first traveling route that has a predetermined length and forms a part of a traveling route from a current position to a destination position of the first automatic traveling device such that the first traveling route does not overlap with the second traveling route of the second automatic traveling device.

4. The traveling system according to claim 3, wherein the generation processing circuit generates the second traveling route by setting the control point included in a predetermined range in which the interference is likely to occur from the tag corresponding to the first traveling route as a prohibition point at which traveling of the second automatic traveling device is prohibited.

5. The traveling system according to claim 3, wherein the generation processing circuit
   repeatedly executes a process of generating the subsequent first traveling route by using an end position of the first traveling route as a start position of the subsequent first traveling route while the first automatic traveling device is traveling along the first traveling route, and
   repeatedly executes a process of generating the subsequent second traveling route by using an end position of the second traveling route as a start position of the subsequent second traveling route while the second automatic traveling device is traveling along the second traveling route.

6. The traveling system according to claim 1, further comprising an output processing circuit that outputs identification information of the plurality of tags corresponding to the first traveling route to the first automatic traveling device and outputs identification information of the plurality of control points corresponding to the second traveling route to the second automatic traveling device.

7. The traveling system according to claim 1, wherein the second guiding method is at least any of a guiding method for guiding the second automatic traveling device by causing the second automatic traveling device to travel along a linear guide member arranged along a route on a floor surface based on a detection result obtained by detecting the guide member and a guiding method for guiding the second automatic traveling device based on a self-position estimated on the basis of measurement data of a surrounding environment.

8. A traveling method for guiding a first automatic traveling device by a first guiding method for guiding the first automatic traveling device by detecting a plurality of tags arranged on a floor surface and for guiding a second automatic traveling device by a second guiding method different from the first guiding method, the traveling method causing one or more processors to execute:
   registering map data including arrangement information of the plurality of tags;
   setting arrangement information of a plurality of control points in a travelable area of the second automatic traveling device in the map data; and
   generating a first traveling route along which the first automatic traveling device travels by sequentially following the tags and a second traveling route along which the second automatic traveling device travels by sequentially following the control points such that the first automatic traveling device and the second automatic traveling device do not interfere with each other.

9. A non-transitory computer-readable recording medium having recorded thereon a traveling program for guiding a first automatic traveling device by a first guiding method for guiding the first automatic traveling device by detecting a plurality of tags arranged on a floor surface and guiding a second automatic traveling device by a second guiding method different from the first guiding method, the traveling program causing one or more processors to execute:
   registering map data including arrangement information of the plurality of tags;
   setting arrangement information of a plurality of control points in a travelable area of the second automatic traveling device in the map data; and
   generating a first traveling route along which the first automatic traveling device travels by sequentially following the tags and a second traveling route along which the second automatic traveling device travels by sequentially following the control points such that the first automatic traveling device and the second automatic traveling device do not interfere with each other.

* * * * *